US008844040B2

(12) United States Patent
Harris et al.

(10) Patent No.: US 8,844,040 B2
(45) Date of Patent: Sep. 23, 2014

(54) SYSTEMS AND METHODS FOR USING END POINT AUDITING IN CONNECTION WITH TRAFFIC MANAGEMENT

(75) Inventors: James Harris, San Jose, CA (US); Rui Li, Santa Clara, CA (US); Arkesh Kumar, San Jose, CA (US); Ravindranath Thakur, Karnataka (IN); Puneet Agarwal, Karnataka (IN); Akshat Choudhary, Karnataka (IN); Punit Gupta, Karnataka (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 1215 days.

(21) Appl. No.: 12/409,322

(22) Filed: Mar. 23, 2009

(65) Prior Publication Data

US 2010/0242106 A1  Sep. 23, 2010

Related U.S. Application Data

(60) Provisional application No. 61/161,918, filed on Mar. 20, 2009.

(51) Int. Cl.
*H04L 29/06* (2006.01)

(52) U.S. Cl.
CPC ............. *H04L 63/20* (2013.01); *H04L 63/08* (2013.01); *H04L 63/166* (2013.01); *H04L 63/0884* (2013.01)
USPC .............. 726/25; 726/22; 726/23; 726/24; 726/26; 726/27; 713/151; 713/152; 713/153; 713/176

(58) Field of Classification Search
USPC ......................................................... 726/25
See application file for complete search history.

(56) References Cited

U.S. PATENT DOCUMENTS 5,812,776 A   9/1998  Gifford
6,460,141 B1  10/2002  Olden
(Continued)

FOREIGN PATENT DOCUMENTS

CN  101069145 A   11/2007
EP  1 655 978       5/2006
EP  1 655 978 A1    5/2006

OTHER PUBLICATIONS

International Search Report for PCT/US2010/025227 dated Jul. 30, 2010.
(Continued)

*Primary Examiner* — Longbit Chai
(74) *Attorney, Agent, or Firm* — Foley & Lardner LLP; Christopher J. McKenna; Paul M. H. Pua

(57) ABSTRACT

The present invention provides a system and method of managing traffic traversing an intermediary based on a result of end point auditing. An authentication virtual server of an intermediary may determine a result of an end point analysis scan of a client. Responsive to the determination, the traffic management virtual server can obtain the result from the authentication virtual server. Further, the traffic management virtual server may apply the result in one or more traffic management policies to manage network traffic of a connection of the client traversing the intermediary. In some embodiments, the authentication virtual server may receive one or more expressions evaluated by the client. The one or more expressions identifies one or more attributes of the client. The traffic management virtual server can also determine a type of compression or encryption for the connection based on applying the one or more traffic management policies using the result.

20 Claims, 19 Drawing Sheets

(56) References Cited

U.S. PATENT DOCUMENTS

| | | | |
|---|---|---|---|
| 7,117,356 B2 | 10/2006 | LaCous | |
| 7,185,364 B2 | 2/2007 | Knouse et al. | |
| 7,353,282 B2 | 4/2008 | Nichols et al. | |
| 7,640,574 B1 | 12/2009 | Kim et al. | |
| 7,721,326 B2 | 5/2010 | Bauban et al. | |
| 8,015,563 B2 | 9/2011 | Araujo et al. | |
| 2004/0054791 A1 | 3/2004 | Chakraborty et al. | |
| 2004/0059931 A1* | 3/2004 | Fulkerson et al. | 713/200 |
| 2004/0088423 A1 | 5/2004 | Miller et al. | |
| 2004/0158617 A1 | 8/2004 | Shanny et al. | |
| 2005/0138104 A1 | 6/2005 | Houh et al. | |
| 2006/0005032 A1 | 1/2006 | Cain et al. | |
| 2006/0069668 A1 | 3/2006 | Braddy et al. | |
| 2006/0095526 A1 | 5/2006 | Levergood et al. | |
| 2006/0117175 A1 | 6/2006 | Miura et al. | |
| 2006/0130140 A1 | 6/2006 | Andreev et al. | |
| 2006/0206728 A1 | 9/2006 | Masuda | |
| 2007/0050850 A1 | 3/2007 | Katoh et al. | |
| 2007/0089167 A1 | 4/2007 | Villavicencio | |
| 2007/0186106 A1* | 8/2007 | Ting et al. | 713/168 |
| 2007/0277231 A1 | 11/2007 | Medvinsky et al. | |
| 2007/0283413 A1 | 12/2007 | Shan et al. | |
| 2008/0005285 A1 | 1/2008 | Robinson et al. | |
| 2008/0025297 A1 | 1/2008 | Kashyap | |
| 2008/0034198 A1 | 2/2008 | He et al. | |
| 2008/0034410 A1* | 2/2008 | Udupa et al. | 726/5 |
| 2008/0134286 A1 | 6/2008 | Amdur et al. | |
| 2008/0138104 A1 | 6/2008 | Moore et al. | |
| 2008/0189427 A1 | 8/2008 | Offermann | |
| 2008/0263358 A1 | 10/2008 | Alme | |
| 2008/0301770 A1 | 12/2008 | Kinder | |
| 2009/0113539 A1 | 4/2009 | Shu et al. | |
| 2009/0144482 A1 | 6/2009 | Tankleff | |
| 2010/0023996 A1 | 1/2010 | Sabin et al. | |
| 2010/0037296 A1 | 2/2010 | Silverstone | |
| 2010/0138899 A1 | 6/2010 | Yamamoto et al. | |
| 2010/0154042 A1 | 6/2010 | Miyamoto et al. | |
| 2011/0179412 A1 | 7/2011 | Nakae et al. | |
| 2011/0296489 A1 | 12/2011 | Fernandez Alonso et al. | |

OTHER PUBLICATIONS

Written Opinion for PCT/US2010/025227 dated Sep. 20, 2011.
European Communications pursuant to Article 94(3) EPC on 10708452.7 dated Jun. 14, 2012.
International Preliminary Report on Patentability on PCT/US2010025227 dated Sep. 29, 2011.
Office Action on U.S. Appl. No. 12/409,216 dated Nov. 29, 2011.
Office Action on U.S. Appl. No. 12/409,216 dated Apr. 25, 2012.
Office Action on U.S. Appl. No. 12/409,223 dated Nov. 23, 2011.
Office Action on U.S. Appl. No. 12/409,223 dated Apr. 10, 2012.
Notice of Allowance on U.S. Appl. No. 12/409,216 dated Sep. 21, 2012.
CN Office Action for Application No. 201080021938.1 dated Feb. 11, 2014.
Marin McNett, Diwaker Gupta, Amin Vandat, Geoffrey M. Voelker:"Usher: an extensible framework for managing clusters of virtual machines", Proceedings of the 21st Large Installation System Administration Conference (LISA '07), pp. 167-181, Nov. 11-16, 2007, Texas.
US Notice of Allowance for U.S. Appl. No. 12/409,223 dated Mar. 6, 2014.

* cited by examiner

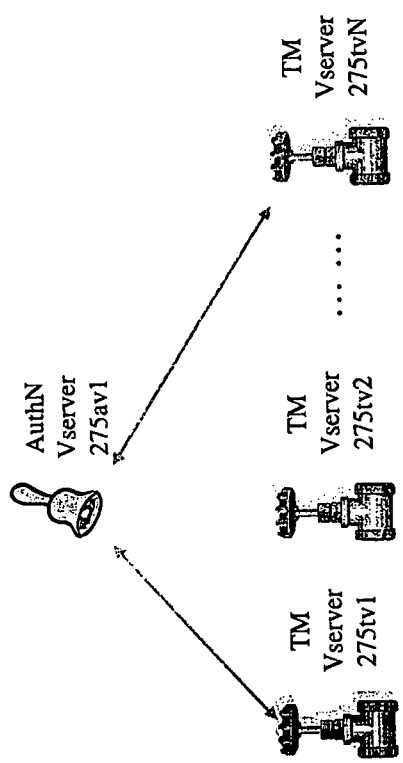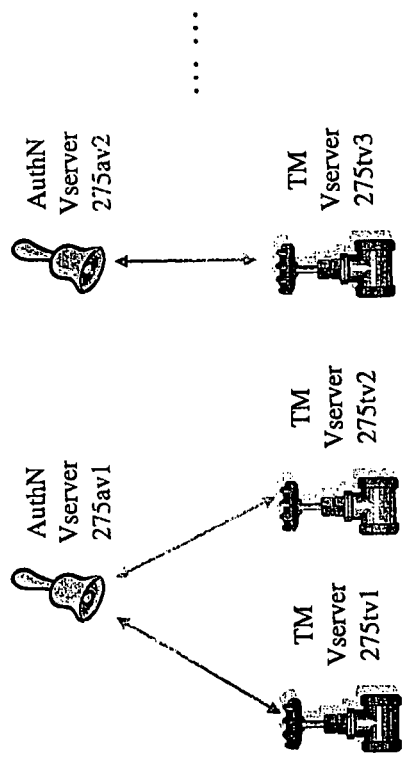
FIG. 4A
FIG. 4B

SYSTEMS AND METHODS FOR USING END
POINT AUDITING IN CONNECTION WITH
TRAFFIC MANAGEMENT

RELATED APPLICATIONS

The present application claims priority to U.S. Provisional Application No. 61/161,918 filed on Mar. 20, 2009, incorporated herein by reference in its entirety.

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE INVENTION

The present application generally relates to data communication networks. In particular, the present appliance relates to systems and methods for selective authentication, authorization and auditing in connection with traffic management.

BACKGROUND

A corporate or enterprise may deploy various services across a network to serve users from many areas. A user may use a client machine to request to access a service, such as a web or application server, provided by the enterprise. The enterprise in order to improve the access to this service may dynamically deploy multiple servers at various geographical locations in order to improve traffic management and meet the demand of users according to network bandwidth, traffic and other factors. Traffic management services may be provided by network servers or appliances in conjunction with traffic management policies. For example, the enterprise may use a load balancer to manage or distribute network traffic across these servers. Furthermore, in order to determine whether to grant access to a client machine requesting access to the service, authentication may be performed against the user operating the client machine. This authentication process may be provided by an authentication server in the network, such as a RADIUS server, and initiated by the access request. Other authorization, authentication and auditing/accounting (AAA) services may also be provided to establish and monitor each client-server connection. These AAA services are typically provided by different network modules. Moreover, authentication services and traffic management services are typically implemented and/or designed separately.

BRIEF SUMMARY

The present solution provides systems and methods of providing authorization, authentication and auditing/accounting (AAA) support for traffic management, enhancing the level of integration and interoperability between the two sets of services by associating policy features and extending handshaking capabilities. In addition, the association between the AAA and traffic management services can be dynamic and/or static and may be implemented in a number of configurations.

In one aspect, a method for authentication of network traffic managed by a traffic management virtual server includes determining, by a traffic management virtual server, that the client has not been authenticated from a request of the client to access a server. The request includes a first uniform resource locator (URL). Responsive to the request, the traffic management virtual server may transmit a response to the client. This response includes the first URL and instructions to redirect to an authentication virtual server. The authentication virtual server may receive a second request from the client. The second request identifies the first URL. The authentication virtual server may then authenticate credentials received from the client and establish an authentication session for the client. This authentication session may identify one or more policies. Further, the authentication virtual server may transmit a second response to redirect the client to the traffic management virtual server. The second response identifies the authentication session. The traffic management virtual server may receive a third request from the client. The third request includes an identifier of the authentication session.

In some embodiments, the traffic management virtual server can determine that the request does not include the identifier of the authentication session. In one embodiment, the traffic management virtual server may transmit the response identifying the first URL via a hidden form. The traffic management virtual server may also transmit the response including a script to trigger a transmission of a POST request to the authentication virtual server. Responsive to transmitting the response, the authentication virtual server may receive the second request comprising a POST message to a predetermined URL. In some embodiments, in addition to authenticating credentials received from the client, the authentication virtual server stores the first URL and domain of the traffic management virtual server with the authentication session.

In some embodiments, responsive to receiving the third request, the traffic management virtual server, sometimes referred to as a "vServer", may validate the authentication session identified by the identifier. The traffic management vServer may also identify the one or more policies of the authentication session using the identifier. Further, the traffic management vServer may apply an authorization policy of the one or more policies of the authentication session to the third request. The traffic management vServer may also apply a traffic management policy of the one or more policies of the authentication session to the third request.

In another aspect, a system of providing authentication of network traffic managed by a traffic management virtual server includes a traffic management virtual server. The traffic management virtual server may determine from a request of a client to access a server that the client has not been authenticated. The request can include a first uniform resource locator (URL). Responsive to the request, traffic management virtual server may transmit a response including the first URL and instructions to the client to redirect to a second virtual server for authentication. The system also includes an authentication virtual server receiving a second request from the client. The second request identifies the first URL. Further, the authentication virtual server can authenticate credentials received from the client and establish an authentication session for the client. The authentication session may identify one or more policies. In addition, the authentication virtual server may transmit a second response to redirect the client to the traffic management virtual server. The second response identifies the authentication session. The traffic management virtual server may receive a third request from the client. The third request includes an identifier of the authentication session.

In yet another aspect, a method for dynamically selecting an authentication virtual server from a plurality of authentication virtual servers includes determining, by a traffic management virtual server, from a request received from a client to access content of a server that the client has not been authenticated. The traffic management virtual server may identify a policy for selecting one authentication virtual server from a plurality of authentication virtual servers to provide authentication of the client. The traffic management virtual server can select, via the policy, an authentication virtual server of the plurality of authentication virtual servers to authenticate the client. Responsive to the request, the traffic management virtual server may transmit a response to the client. The response includes an instruction to redirect to the selected authentication virtual server.

In one embodiment, the traffic management virtual server determines that the request does not include a session cookie. In another embodiment, the traffic management virtual server determines that the request does not include an index to a valid authentication session. The traffic management virtual server may identify the policy for selecting the authentication virtual server based on a user of the request. The traffic management virtual server may also identify the policy for selecting the authentication virtual server based on information collected about software installed on the client. Further, the traffic management virtual server can identify the policy for selecting the authentication virtual server based on information collected about an operating system on the client.

In one embodiment, the traffic management virtual server selects the authentication virtual server as a first type of authentication virtual server from a plurality of types of authentication virtual servers, responsive to identification of the policy. In another embodiment, the traffic management virtual server selects the authentication virtual server based on a type of authentication of a plurality of types of authentications, responsive to the policy. In still another embodiment, the traffic management virtual server selects the authentication virtual server based on negotiating with the client a type of authentication of a plurality of types of authentications. In some embodiments, the traffic management virtual server receives a second request to access a resource. The second request can include a session cookie identifying an index to an authentication session of the authentication virtual server. The traffic management virtual server may also determine from the authentication session identified by the index one or more traffic management policies to apply to the second request.

In still another aspect, a system for dynamically selecting an authentication virtual server from a plurality of authentication virtual servers includes a traffic management virtual server of an appliance. The traffic management virtual server can determine from a request received from a client to access content of a server that the client has not been authenticated. The traffic management virtual server may also identify a policy for selecting an authentication virtual server from a plurality of authentication virtual servers to provide authentication of the client. The system may also include a policy engine that provides to the traffic management virtual server a policy to select an authentication virtual server of the plurality of authentication virtual servers to authenticate the client. The system can also include a network engine of the traffic management virtual server. The network engine may transmit to the client a response to the request. The response includes an instruction to redirect to the selected authentication virtual server.

In still even another aspect, a method of managing traffic traversing an intermediary based on a result of end point auditing includes determining, by an authentication virtual server of an intermediary, a result of an end point analysis scan of a client. The traffic management virtual server can obtain the result from the authentication virtual server. Further, the traffic management virtual server may apply the result in one or more traffic management policies to manage network traffic of a connection of the client traversing the intermediary.

In one embodiment, the authentication virtual server receives an expression from the client identifying one of the following to be present on the client: a version of an operating system, a service pack of the operating system, a running service, a running process, and a file. The authentication virtual server may also receive an expression identifying one of the following, or a version of the following, to be present on the client: antivirus software, personal firewall software, antispam software, and internet security software. In some embodiments, the authentication virtual server may receive one or more expressions evaluated by the client. The one or more expressions identify one or more attributes of the client. The authentication virtual server may provide an evaluation of one or more expressions identifying one or more attributes of the client as the result. The authentication virtual server can also provide the result as input to the one or more traffic management policies of the traffic management virtual server.

In some embodiments, the traffic management virtual server determines a type of compression for the connection based on applying the one or more traffic management policies using the result. The traffic management virtual server can also determine a type of encryption for the connection based on applying the one or more traffic management policies using the result. Further, the traffic management virtual server may determine one or more file type associations for the connection based on applying the one or more traffic management policies using the result. The traffic management virtual server can also determine whether to use or not use a single-sign on for the connection based on applying the result via the one or more traffic management policies.

In yet even another aspect, an intermediary for managing traffic traversing the intermediary based on a result of end point auditing includes an authentication virtual server. The authentication virtual server can determine a result of an end point analysis scan of a client. The intermediary also includes a traffic management virtual server that obtains the result from the authentication virtual server, and applies the result in one or more traffic management policies to manage a connection of the client traversing the intermediary.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 4A-4E are block diagrams of embodiments of configurations in which authentication vServers may be associated with traffic management vServers;

Figure 1A:
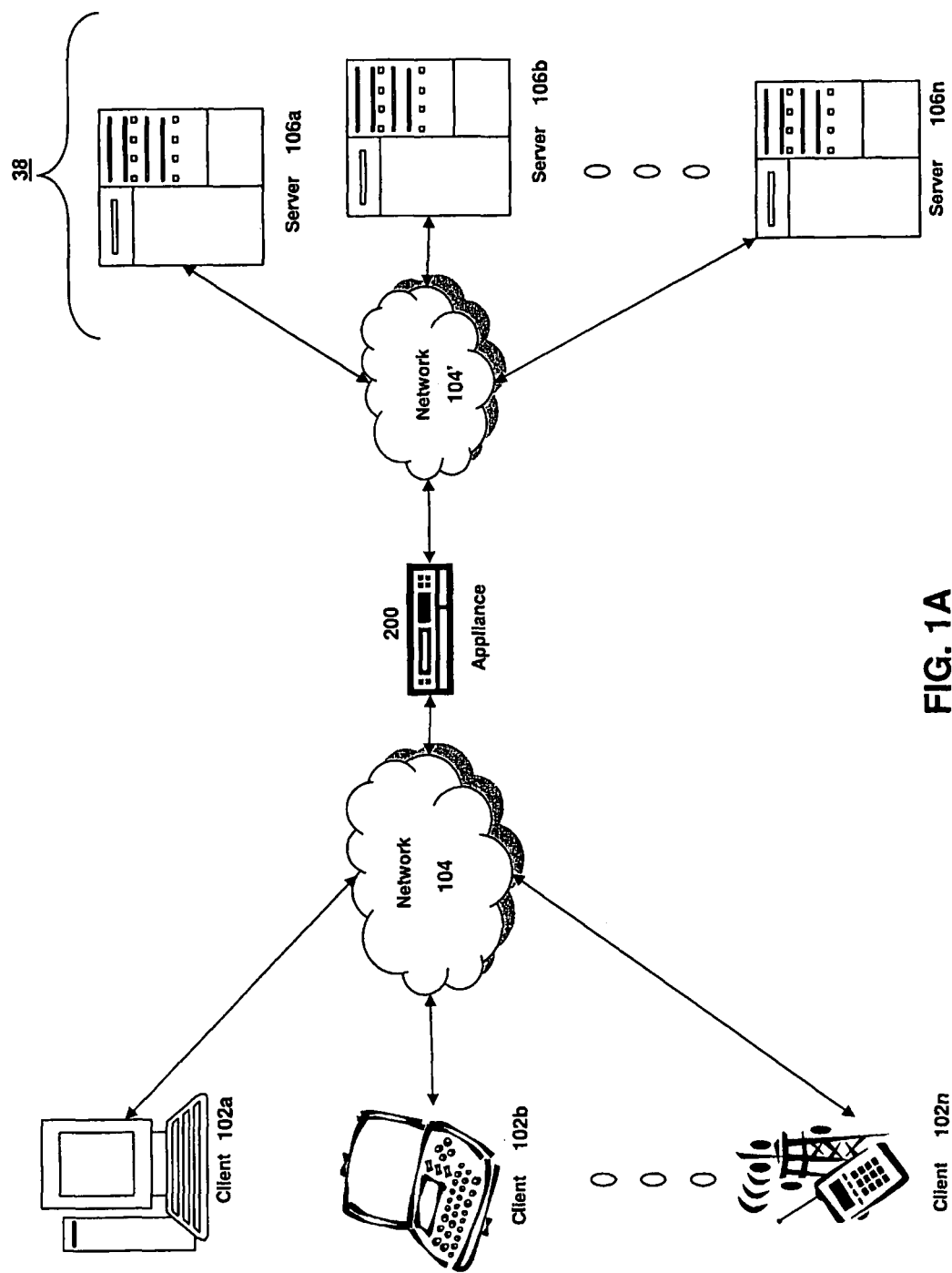
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server; and Section D describes embodiments of systems and methods for providing authentication, authorization and auditing support to traffic management.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
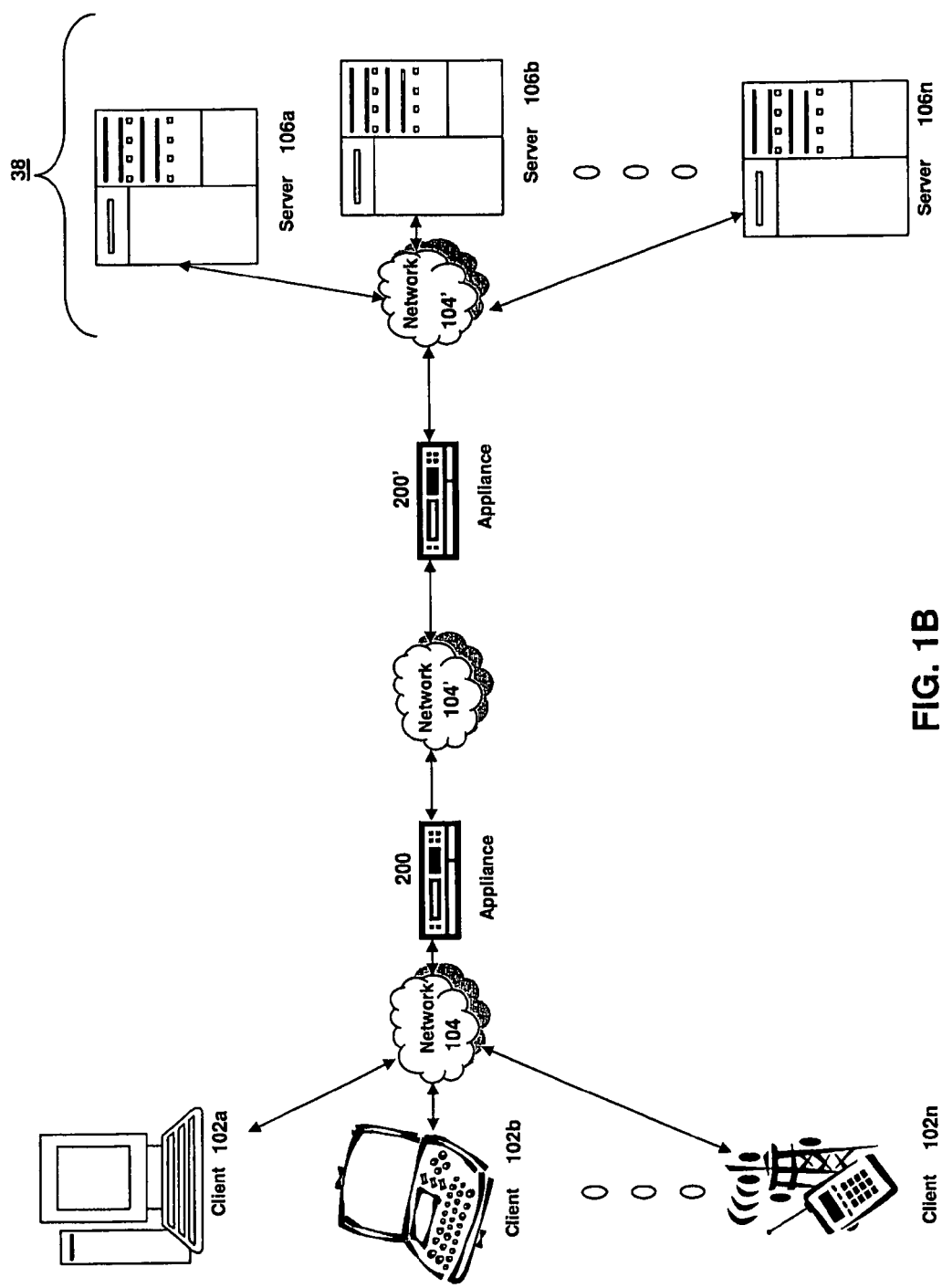
FIG. 1B is a block diagram of an embodiment of an environment for delivering a computing environment from a server to a client via an appliance.
Figure 1C:
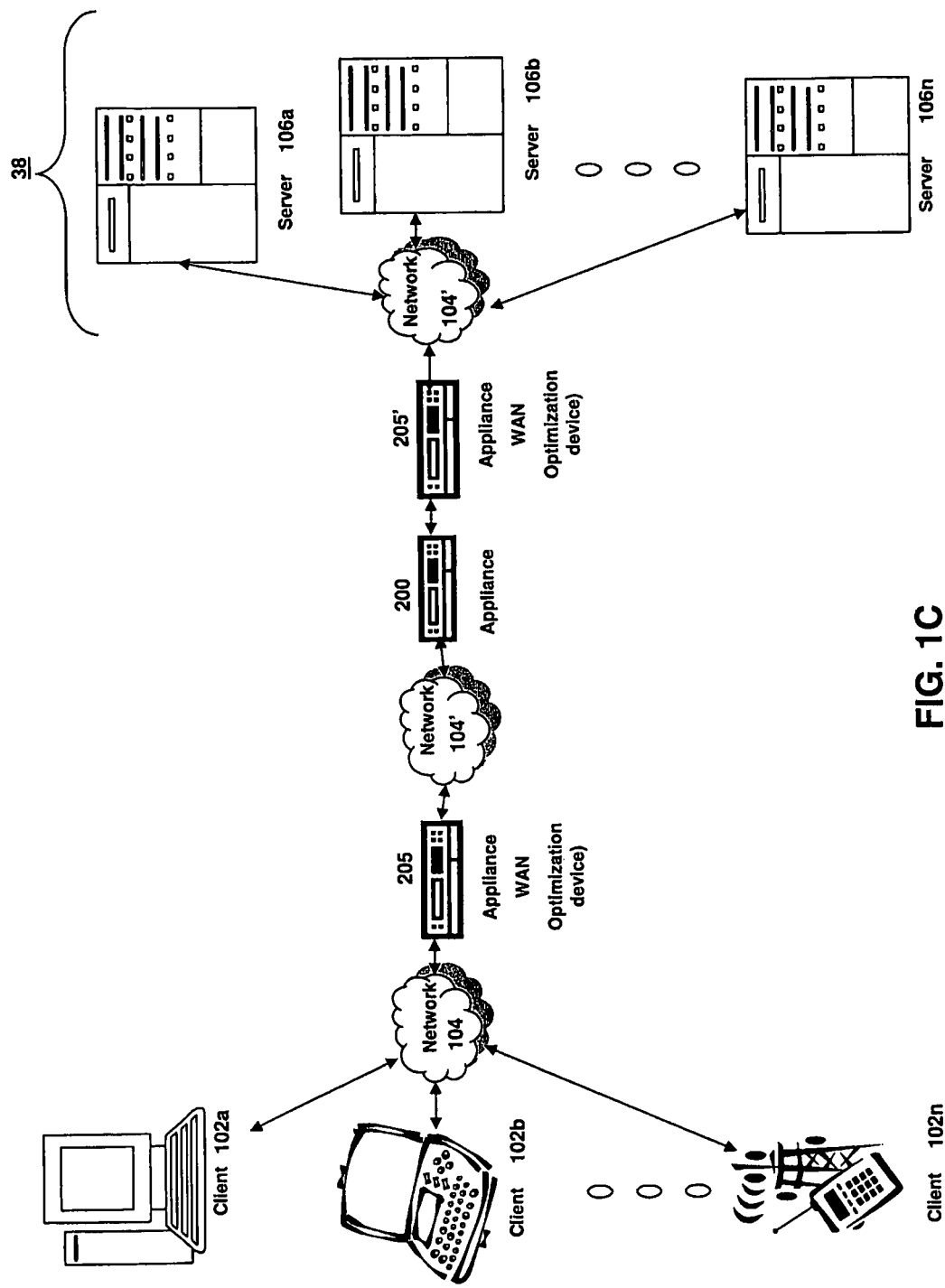
FIGS. 1C and 1D are block diagrams of embodiments of an environment for delivering a computing environment from a server to a client via a network.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
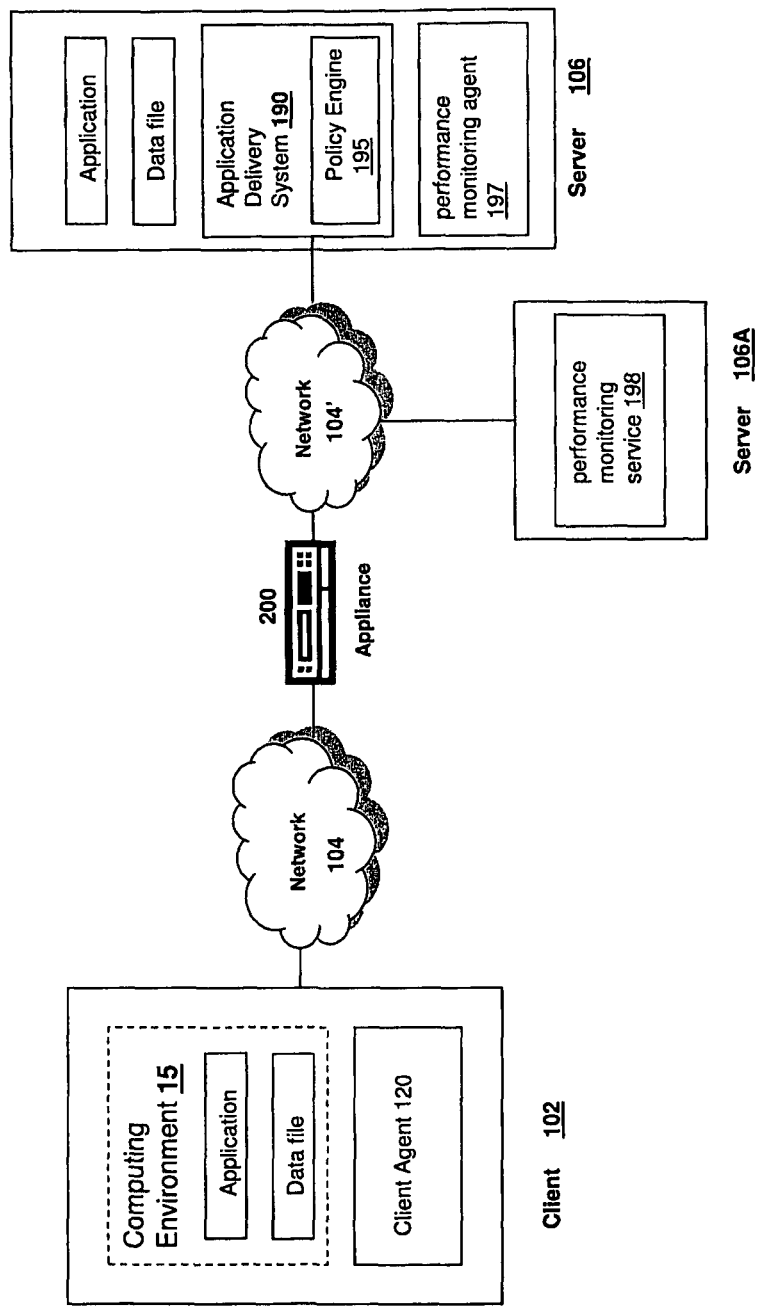

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
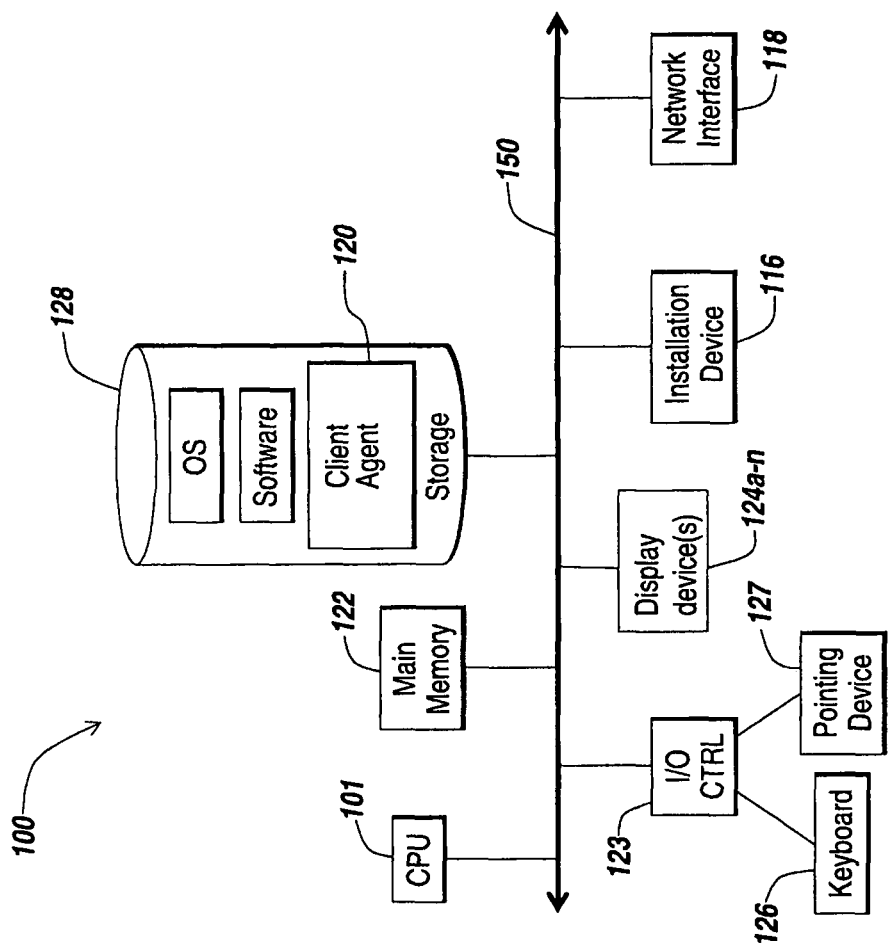
FIGS. 1E and 1F are block diagrams of embodiments of a computing device.
Figure 1F:
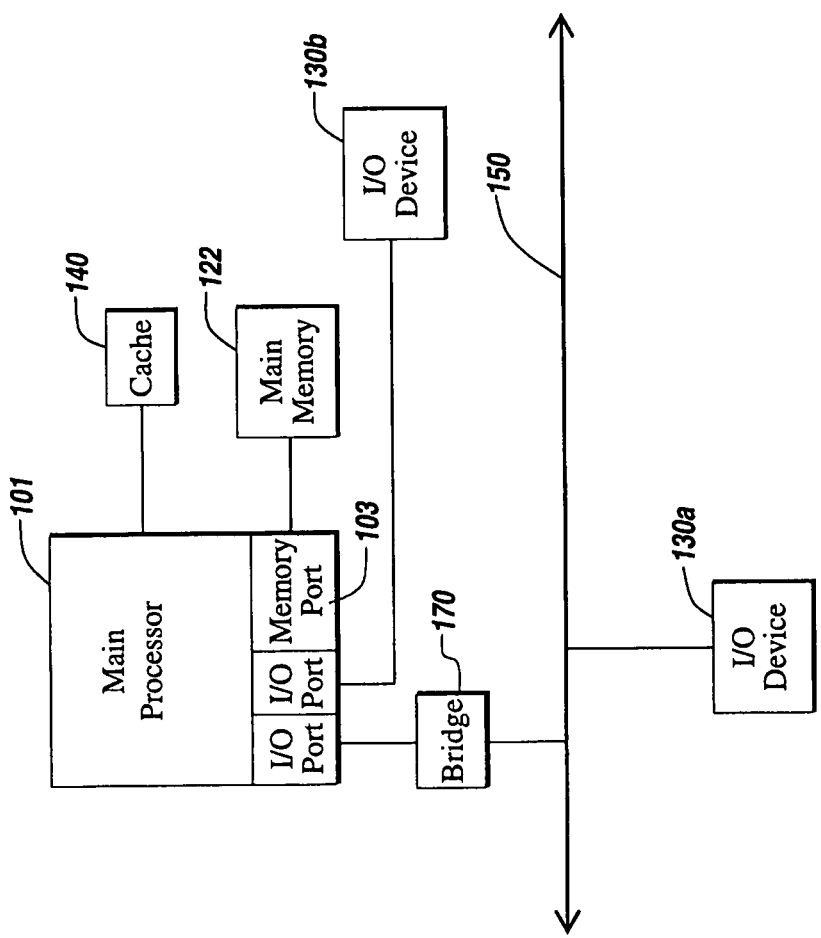

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
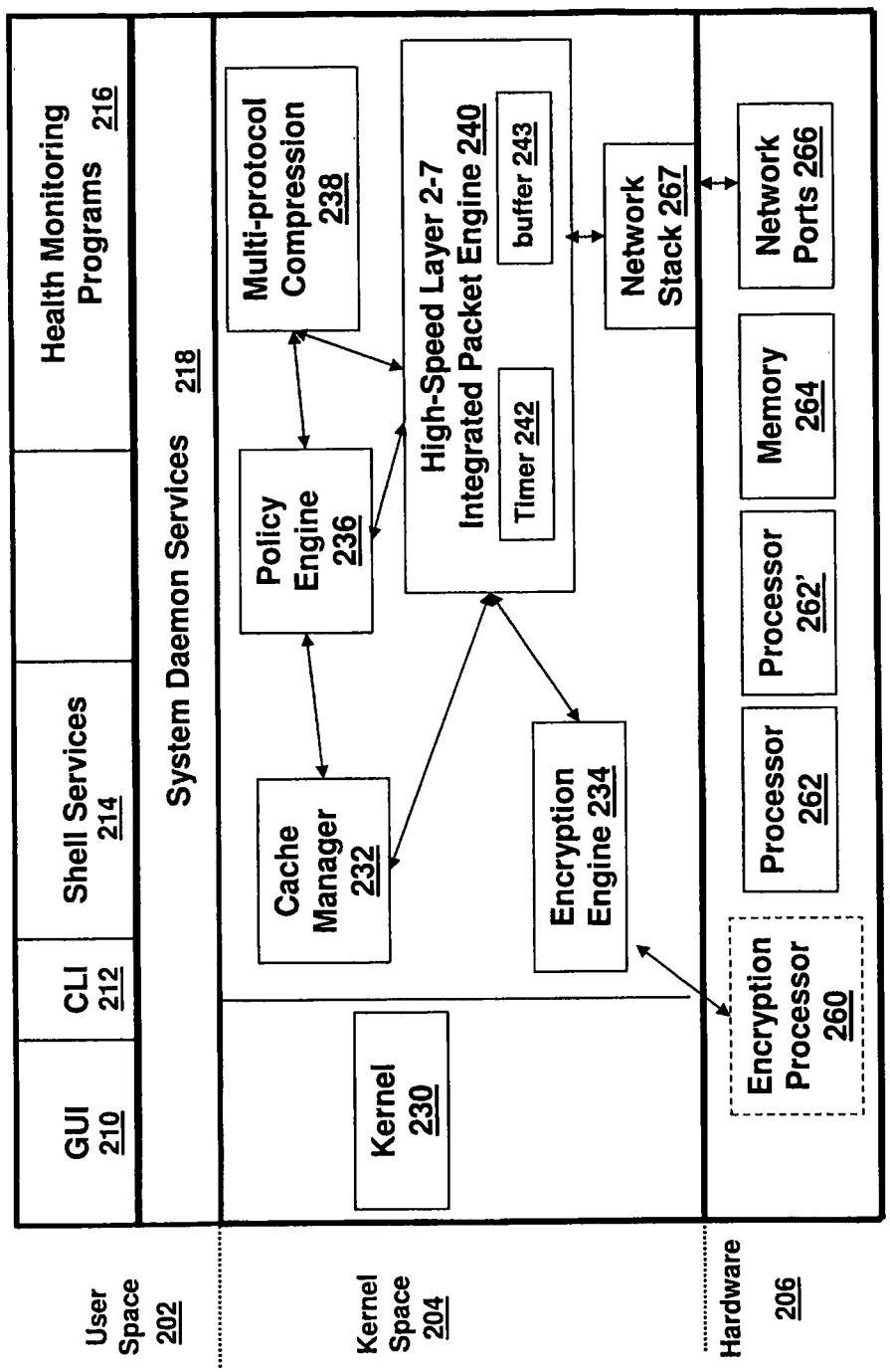
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of UNIX operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

Figure 2B:
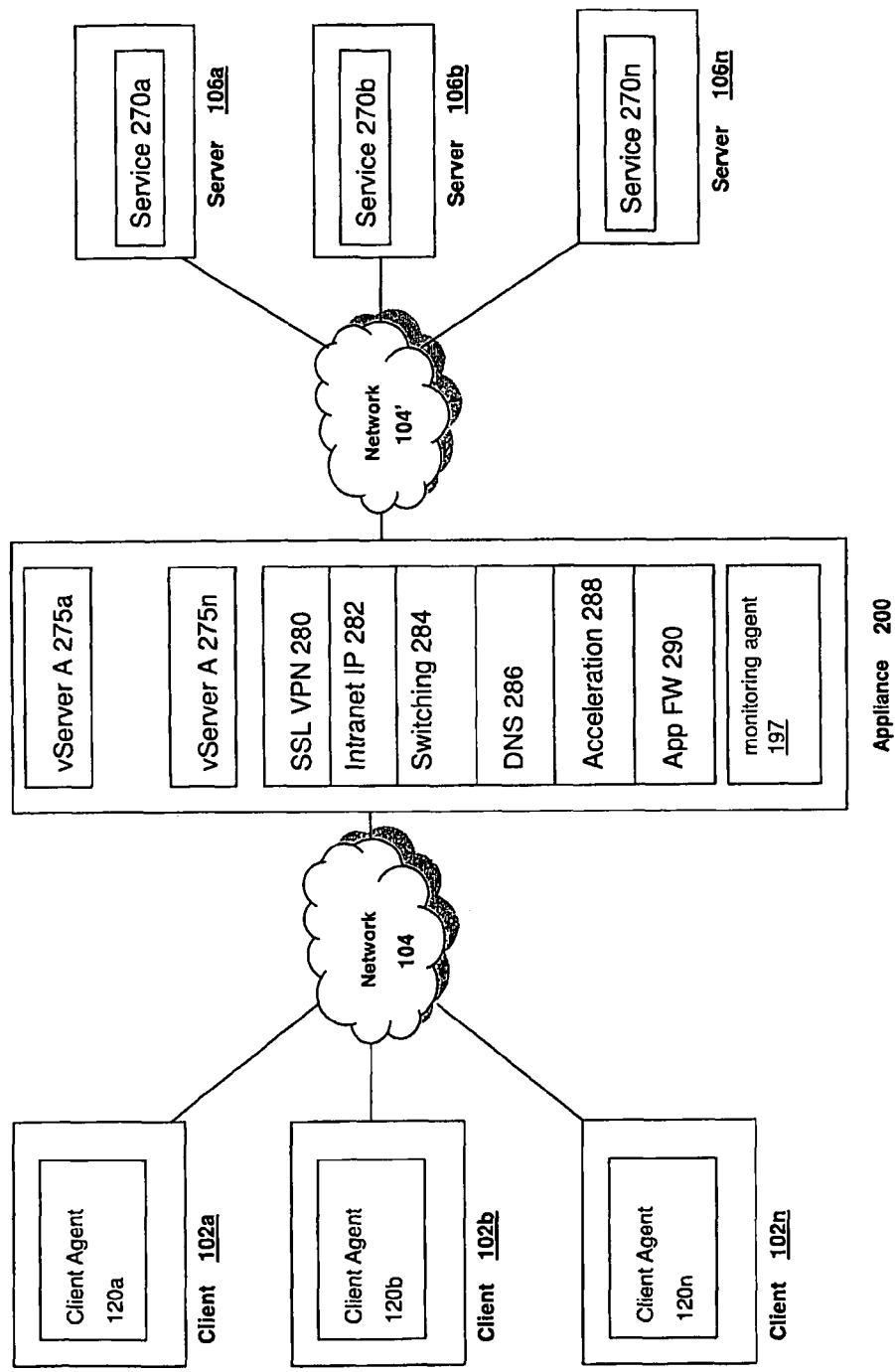
FIG. 2B is a block diagram of another embodiment of an appliance for optimizing, accelerating, load-balancing and routing communications between a client and a server.

In some embodiments, the policy engine 236 may provide a configuration mechanism to allow a user to identify, specify, define or configure policies directing behavior of any other components or functionality of an appliance, including without limitation the components described in FIG. 2B such as vServers 275, VPN functions 280, Intranet IP functions 282, switching functions 284, DNS functions 286, acceleration functions 288, application firewall functions 290, and monitoring agents 197. In other embodiments, the policy engine 236 may check, evaluate, implement, or otherwise act in response to any configured policies, and may also direct the operation of one or more appliance functions in response to a policy.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
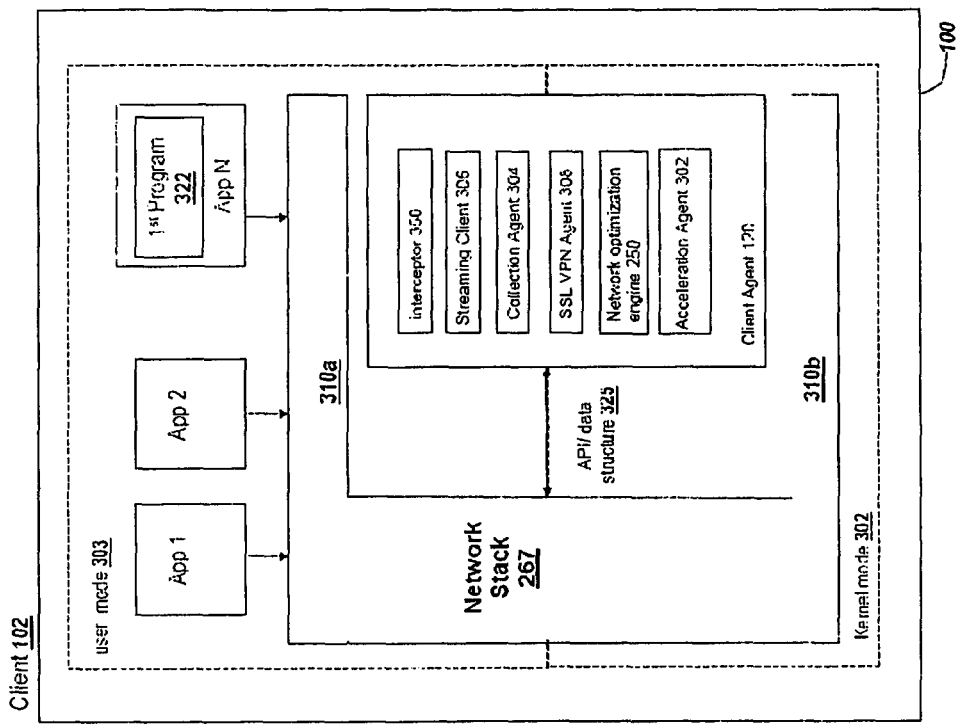
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system and/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Authentication, Authorization and Auditing (AAA) Support for Traffic Management In some embodiments of a traffic management system, a client 102 transmits a request to access a service 270 provided by one or more servers 106. The request may be intercepted and processed by an intermediary, such as an appliance 200, that provides traffic management functions. By way of example and in view of various traffic management and load balancing products, the appliance 200 can be any of the product embodiments referred to as NetScaler manufactured by Citrix Systems, Inc., BigIP device manufactured by F5 Networks, Inc., AppDirector appliance manufactured by Radware, LTD, or appliances manufactured by Cisco Systems, Inc. or Nortel Networks, Inc. The appliance 200 may have one or more virtual servers 275A-275N configured, constructed or designed to provide various network communications functionality as described above in connection with FIG. 2A.

The appliance 200 may include or communicate with one or more traffic management vServers 275tv providing traffic management (TM) functionality between the client 102 and the one or more servers 106 over one or more networks 104, 104'. In some embodiments, the appliance 200 includes or communicates with one or more authentication (AuthN) vServers 275av that provide authentication services for controlling client 102 access to the service 270. To provide AAA support for traffic management features, traffic management vServers 275tv and authentication vServers 275av may communicate to process any aspect of client-server access and traffic. Any of the traffic management vServers 275tv and authentication vServers 275av may also reside in one or more appliances 200 or servers 106 and communicate over one or more networks 104, 104'. In addition, any number of traffic management vServers 275tv and authentication vServers 275av can be hierarchically connected or arranged, either structurally through their respective host servers or logically, to provide traffic management and authentication services.

vServer
Traffic Management vServer

A traffic management vServer 275tv may be any type of virtual server for performing traffic management activities, including load balancing (LB), content switching (CS) and cache redirection (CR). For example, cache redirection vServers, in some embodiments, identifies cacheable and non-cacheable messages for redirection to another server that may be a vServer (such as a LB vServer), a cache server, or an origin server. By selectively redirecting traffic, some requested content, such as frequently accessed content, may be retrieved from caches. In one of these embodiments, cache redirection identifies cacheable and non-cacheable requests for HTTP transactions. Cache redirection may identify cacheable and non-cacheable requests for HTTP transactions by parsing the URL and the HTTP header of each request. Content switching, on the other hand, may include a variety of manipulation techniques for getting data from one or more sources to an endpoint in a way that may optimize use of a network.

A traffic management vServer 275tv may include any embodiment of the vServer 275 described above in connection with FIG. 2B, and provide any type of functionality and feature. The traffic management vServer 275tv may operate according to a set of one or more TM policies. Moreover, the TM vServer 275tv can include or operate with a policy engine 236, such as any embodiment of the policy engine 236 described above in connection with FIG. 2A. In some embodiments, one or more traffic management features may be combined from one or more TM vServers 275tv and one or more sets of TM policies. In one embodiment, the one or more features may combine to the extent that they do not conflict with each other. By way of illustration, and in one embodiment, features supported by a TM vServer and/or traffic management policies can include, but are not limited to:

- 401 authentication method support, such as Basic-Authentication;
- authentication support for non-HTTP clients;
- support for any type or form of complicated and/or flexible associations between authentication and traffic management vServers,
  - In addition to being associated to a LB vServer, an authentication vServer can also be associated to a CS or CR vServer;
  - Support many-to-many relationships between authentication and traffic management vServers;
  - Allow policy-based dynamically-selected authentication vServer;
  - Allow interactive decision on which type of authentication to use. An authentication vServer can decide which type of authentication to perform. The client may be allowed to negotiate with the authentication vServer on the type of authentication the client can select.
- Session Sync to support external authentication among Active/Active-configured appliances (such as CITRIX Netscaler appliances). This can support, in some embodiments, a requirement that an authentication vServer reside on one appliance (where the authentication behavior can be defined/controlled) and traffic management vServers on other appliances, i.e. traffic management vServers belonging to same domain can spread across multiple appliances for load distribution purposes but still use single-sign-on (SSO) authentication. For example, and in one embodiment, a user authenticated on one appliance (e.g., by virtue of accessing a traffic management vServers on it and getting redirected to another appliance for authentication service) can single-sign-on to any traffic management vServers on any other appliances belonging to same domain.
- support for customizable session management portal page for end-users;
- support for integration with other modules:
  - Application Firewall (AppFirewall), including XML support
  - Integrated Caching
  - Compression Network Engine A traffic management vServer 275*tv* may include and/or operate a network engine 240. The network engine 240 can be a combination of hardware and software. The network engine 240 may incorporate one or more features from any embodiment of the integrated packet engine 240 described above in connection with FIG. 2A. The network engine 240 may include a transceiver for receiving and transmitting network traffic. In some embodiments, the network engine 240 may also incorporate a hardware interface, from the appliance 200 for example, to connect with the network 104 and other network components. In one embodiment, the network engine 240 interfaces with the client 102 and/or the authentication vServer 275*av*. The network engine 240 can perform any type or form of data processing, such as compression, encryption, acceleration, buffering, retrieval, translation, redirection, and protocol processing. In addition, the network engine may access and/or update a stored session table, such as a AAA-TM session table. The network engine 240 can include or communicate with a policy engine 236 and access one or more policies. In one embodiment, the network engine 240 can provide and/or apply the one or more policies accessed. In some embodiments, the network engine 240 may provide some or all of the functions of the traffic management vServer 275*tv*.

Authentication vServer

An authentication vServer 275*av* may be a virtual server performing any combination of authorization, authentication and auditing/accounting features of an AAA service. In some embodiments, an authentication vServer 275*av* may comprise any embodiment of the vServer 275 described above in connection with FIG. 2B, and provide any number and type of functionality and feature. Further, the authentication vServer 275*av* can include and/or operate with any embodiment of the policy engine 236 described above in connection with FIG. 2A. In some embodiments, the authentication vServer 275*av* may include any embodiment and/or feature of a virtual private network (VPN) vServer for authenticating a user accessing a TM vServer 275*tv* and/or a service 270. In one of these embodiments, the VPN vServer may be a light-weight vServer.

In some embodiments, an authentication vServer 275*av* may reside in or communicate with one or more authentication servers, such as Remote Access Remote Authentication Dial In User Service (RADIUS) servers, firewalls, access control servers, and Authentication, Authorization and Auditing/Accounting (AAA) servers clustered or distributed over one or more networks 104, 104'.

The authentication vServer 275*av* can support flexible policy-based rules. The authentication vServer 275*av* can also provide any of the AAA services accordingly to various access request scenarios. The authentication vServer 275*av* may operate according to a set of one or more authentication policies 568. The authentication policies 568 may also include at least one authorization policy and/or at least one auditing/accounting (hereafter generally referred to as "auditing") policy. In some embodiments, authorization may be performed by authorization policies configured on the traffic management vServer 275*tv*. In some of these embodiments, the authentication vServer 275*av* only provides authentication-related services. Further, the authentication policies 568 may include at least one VPN policy. In some embodiments, authentication support for traffic management may be implemented by combining existing VPN features, such as VPN policies and data structures, with other authentication features. In some embodiments, VPN features that may be incorporated into the AAA support for traffic management include but are not limited to:

- Single Sign On (SSO) Services
- Cookie Proxying
- Dynamic Per User/Group-aware Traffic Management Policies (such as Integrated Caching, AppFirewall, etc.)
- Forms-based SSO
- Accept inbound SSO Assertion from Microsoft ADFS
- Accept inbound SSO Assertion from Netegrity. For example, security and markup language (SAML) based support.
- Accept inbound SSO Assertion from other authentication or internet download manager (IDM) vendor.
- Extensible Authentication to custom/homegrown/one-off authentication systems An authentication vServer 275*av* may support any number, type and form of authentication and/or authorization servers, such as Active Directory (AD), Lightweight Directory Access Protocol (LDAP), RADIUS, RSA SecureID, Terminal Access Controller Access-Control (TACACS) and TACACS+, WINDOWS NT LAN Manager (NTLM) and Smart Card sign-on. In some embodiments, a plurality of authentication vServers may support two or more different types of authentication. In one of these embodiments, an authentication vServer 275av can be selected for the type of authentication (e.g., TACACS+) the authentication vServer 275av supports. A type of authentication available through an authentication vServer may be supported by one or more authentication and/or authorization servers. For example, two RADIUS servers may support a RADIUS vServer. One or both RADIUS servers may be bound or assigned to the authentication vServer (e.g., statically or dynamically) based on one or more factors, such as geographical proximity, network traffic and processing load on each server. In some embodiments, one or more authentication servers are associated with or assigned or bound to an authentication vServer 275av based on application of one or more policies. The one or more authentication servers may be structurally or logically arranged in cascading form, for example.

Various authentication configurations such as Two-Factor Authentication (T-FA) or dual-password authentication can be supported and customized based on context, dynamically or otherwise. The authentication vServer 275av may also support certificate-based authentication. In some embodiments, AAA features may be combined from one or more authentication vServers 275av, possibly in conjunction with one or more sets of AAA or authentication policies. An authentication vServer 275av may be associated with, or assigned or bound to, one or more TM vServers 275tv in a number of different configurations to be discussed below. An authentication server 275av may be associated with a TM vServer 275tv statically through pre-defined bindings, or dynamically based on one or more policies.

Referring now to FIG. 4A, an embodiment of a system for associating an authentication vServer 275av to one or more TM vServers 275tv is depicted. The authentication vServer 275av may be statically bound to one TM vServer or shared by multiple TM vServers including static and/or non-static bindings.

Referring now to FIG. 4B, two embodiments of a system for associating an authentication vServer 275av to one or more TM vServers 275tv are depicted. In one embodiment, a first authentication vServer 275av1 may be associated to a plurality of TM vServers 275tv1, 275tv2, while a second authentication vServer 275av2 may be associated to one TM vServer 275tv3. Such groupings or assignments may be created depending on factors such as traffic management domain size, load and geographical considerations such as grouping proximity.

In some embodiments, where a plurality of authentication vServers 275av are configured together with a TM vServer 275tv, a tracking and/or verification process may ensure that a client request is processed consistently between the TM vServer 275tv and a selected authentication vServer 275av. For example, the TM vServer 275tv may verify that a redirect message is received from the same authentication vServer 275av selected when the TM vServer 275tv received the initial client request.

Figure 4C:
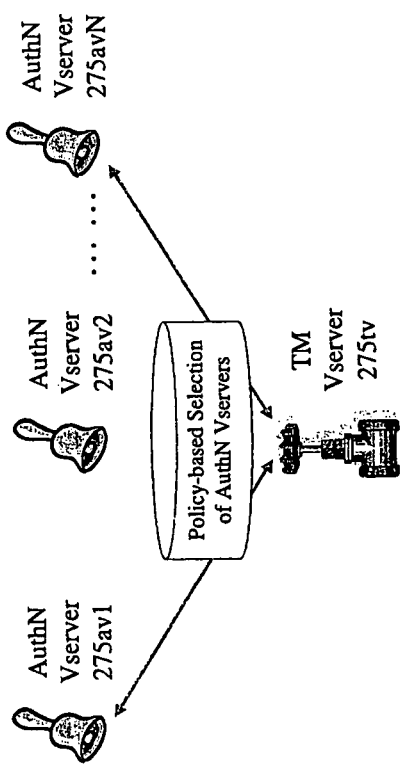

Referring now to FIG. 4C, an embodiment of a system for associating one or more authentication vServers 275av to a TM vServers 275tv is depicted. In brief overview, the system includes one or more policies, a plurality of authentication vServers 275av1-N, and a TM vServer 275tv. An authentication vServer 275av can be dynamically assigned to a TM vServers 275tv based on one or more policies. The one or more policies may be bound to a TM vServer 275tv during runtime. Moreover, any of the one or more authentication vServers 275av can be assigned to the TM vServer 275tv via the one or more policies during runtime to establish an authentication session.

In some embodiments, the one or more policies may include an AppFW policy. An AppFW policy operates in conjunction with an AppFW module, sometimes referred to as an AppSecure module in the context of an appliance manufactured by Citrix Systems, Inc. The AppSecure module may include logic, functions or operations for performing any type and form of content rewriting, such as URL rewriting. In some embodiments, the AppSecure module can perform any type or form of content injection into a request and/or response between a client and a server. The AppSecure module may inject scripts into a response to the client, such as a JavaScript, to perform any type and form of desired functionality. In one embodiment, the AppFw policy may be designed and constructed to rewrite URLs of requests and responses to redirect to, or otherwise associate with, a particular authentication vServer 275av. For example, links (e.g., URLs) in messages received during an authentication session can be modified by a TM vServer in such a way that the links point to a particular authentication vServer 275av.

Authentication vServers 275av can be associated to any form or type of TM vServers 275tv, including any combination and hierarchical arrangement of CR, CS and LB vServers. A unit of traffic, such as a message or packet, may be redirected from a first TM vServer to another TM vServer in the hierarchy. This process may occur over several levels of the hierarchy until a final TM vServer is assigned to manage the traffic. In some embodiments, where a plurality of authentication vServers 275av is associated to a hierarchy of TM vServers. The authentication vServer 275av associated with the most specific TM vServer takes precedence in providing AAA functions. In some other embodiments, however, an authentication vServer 275av associated with a TM vServer 275tv at the top of the hierarchy takes precedence. A TM vServer 275tv managing the overall traffic responsive to a client request may be assigned to the top of the hierarchy. In still other embodiments, the precedence of any authentication vServer 275av may be determined by one or more policies, such as a policy associated with the TM vServer 275tv at the top of the hierarchy.

Figure 4D:
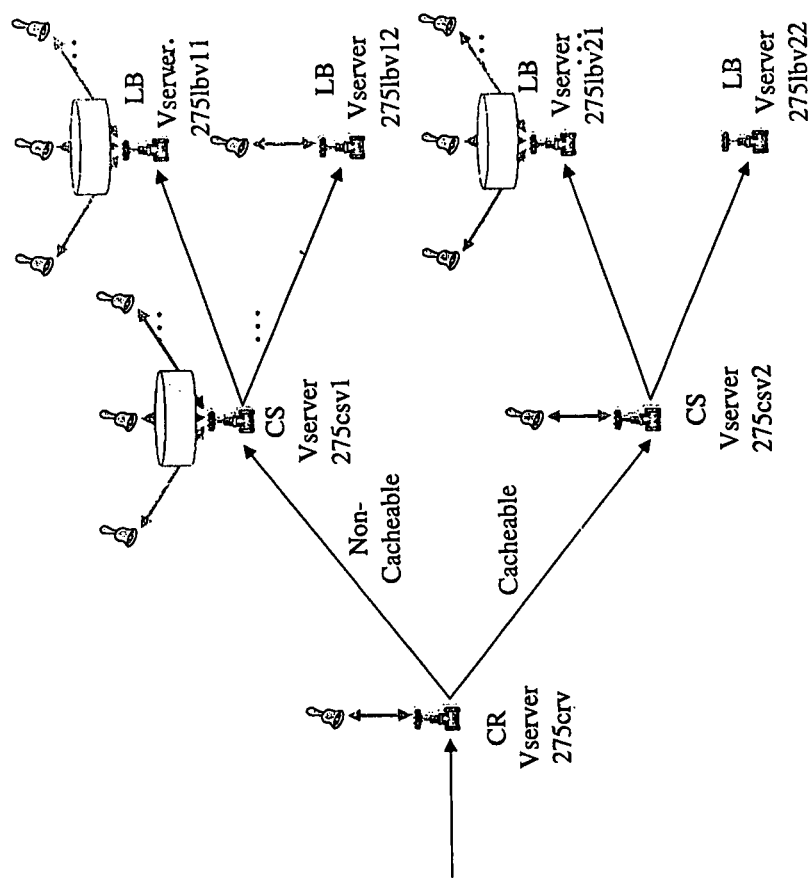

Referring now to FIG. 4D, an embodiment of a system for providing AAA support to traffic management is depicted. In brief overview, the system includes a plurality of CR, CS and LB TM vServers, associated with a plurality of authentication vServers 275av, and arranged in a hierarchical configuration. The system may include any combination and embodiment of configurations described above in connection with FIGS. 4A-4C. In some embodiments, the hierarchical configuration supports content-aware traffic management and authentication. For example, in one embodiment, the traffic received at CR vServer 275crv can be divided into cacheable and non-cacheable traffic. The traffic can include any type and form of messages between one or more clients 102, servers 106 and intermediaries, including requests and responses. In some embodiments, cacheable traffic is directed to CS vServer 275csv2 and non-cacheable traffic to CS vServer 275csv1. The CS vServer 275csv1 may distribute the non-cacheable traffic across LB vServers 275lbv11, 275lbv12, while CS vServer 275csv2 may distribute the cacheable traffic between LB vServers 275lbv21, 275lbv22.

In further details of FIG. 4D, and by way of illustration of one embodiment of an hierarchical configuration, the configuration includes dynamically associated authentication vServers at LB vServers 275lbv11, 275lbv21, and CS vServer 275csv1; statically associated authentication vServers at LB vServer 2751*bv*12, CS vServer 275*csv*2, and CR vServer 275*crv*; and no authentication vServer associated to LB vServer 2751*bv*22. For example, if LB vServer 2751*bv*12 is selected to perform traffic management, the authentication vServer associated to the LB vServer 2751*bv*12 may provide the AAA features. In another embodiment, if a TM vServer not associated to any authentication vServer 275*av* is selected to perform traffic management, AAA features can be provided by an authentication vServer 275*av* associated with a parent of the TM vServer. For example, if LB vServer 2751*bv*22 is selected, an authentication vServer associated to CS vServer 275*csv*2 can provide the AAA features. If a TM vServer has a plurality of parents at a same or different level in the hierarchy, one of the plurality of parents may provide an associated authentication vServer 275*av*, for example, according to authentication vServer availability, geographical or logical proximity, and/or one or more policies.

Figure 4E:
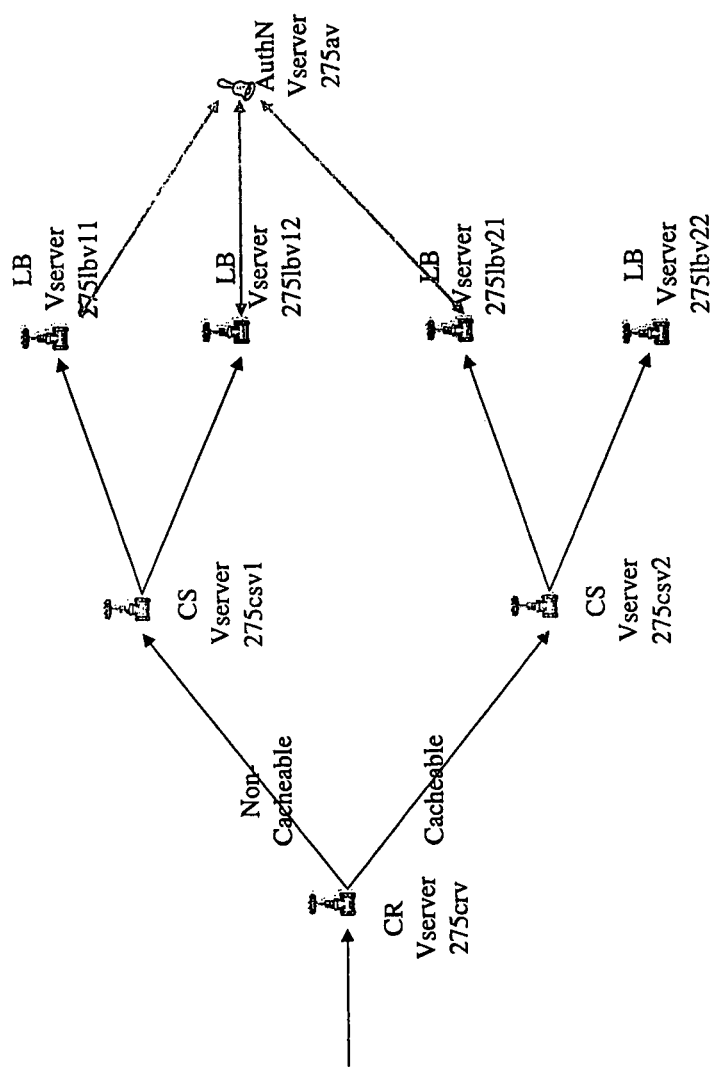

Referring now to FIG. 4E, another embodiment of a system for AAA support to traffic management is depicted. In further details, FIG. 4E illustrates an embodiment in which one authentication vServer 275*av* may be shared by a plurality of TM vServers. In some embodiments, a single authentication vServer 275*av* is configured for a system so that tracking and/or verification processes, and/or policies that bind the authentication vServer 275*av* to a TM vServer 275*tv*, may not be required. In some embodiments, a parent TM vServer may direct all traffic management responsibilities to a child TM vServer so that an authentication vServer 275*av* is associated. For example, CS vServer 275*csv*2 may direct all traffic management responsibilities to LB vServer 2751*bv*21 rather than LB vServer 2751*bv*22. In some other embodiments, traffic management responsibilities directed to a TM vServer not associated with any authentication vServer 275*av* may be managed without AAA support, or may be redirected to another TM vServer associated with an authentication vServer 275*av*.

Figure 5:
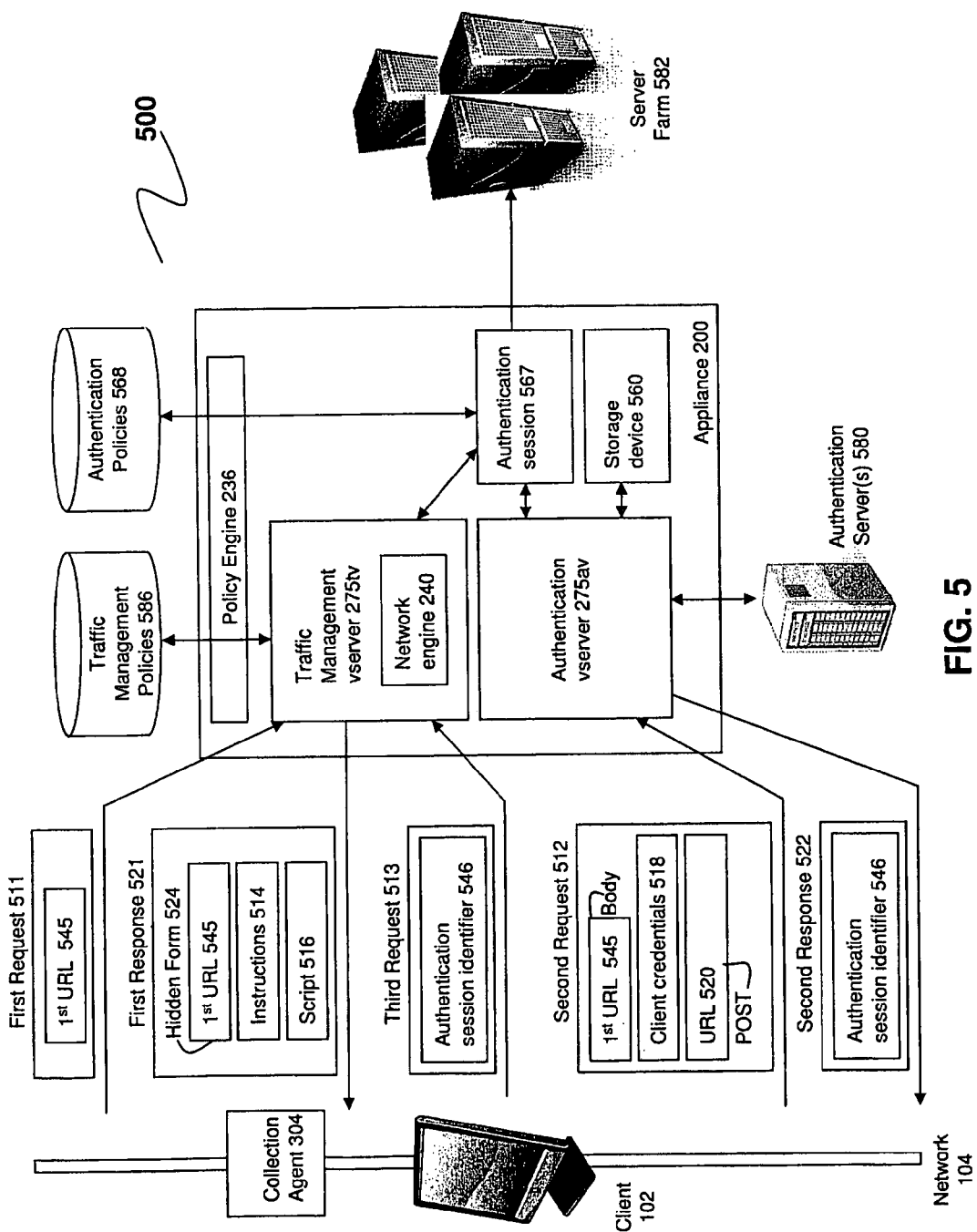
FIG. 5 is a block diagram of an embodiment of a system of providing AAA support for traffic management.

Referring now to FIG. 5, an embodiment of a system 500 for providing AAA support for traffic management is depicted. In brief overview, the system 500 includes one or more TM vServers 275*tv* (hereafter generally referred to as a "TM vServer") associated with one or more authentication vServers 275*av* (hereafter generally referred to as an "authentication vServer"). These vServers may be arranged in any manner, such as in accordance to any embodiment of the configurations described above in connection with FIGS. 4A-E. The TM vServer provides traffic management services between a client 102 and one or more servers 106 in a server farm 582, according to one or more traffic management policies 586. AAA services for any client-server traffic may be provided by the authentication vServer according to one or more authentication policies 568. In addition, a collection agent 304 may obtain information from the client 102 for one or both of the TM vServer and the authentication vServer. Although only one client 102, collection agent 304, application server farm 582 and storage 560 are depicted in the embodiment shown in FIG. 5, it should be understood that the system may provide multiple ones of any or each of those components.

Collection Agent

The collection agent 304 may include any of the embodiments or components of the collection agent 304 described above in connection with FIG. 3 and/or monitoring agent 197 described above in connection with FIG. 2B. The collection agent 304 may be generated from any script or program residing in the appliance 200, storage 560, and/or any other machine or storage device in the network 104. In some embodiments, a script and/or program is transmitted to the client 102 and generates the collection agent 304. In some other embodiments, the collection agent 304 executes in the appliance 200 or any other machine in the network and remotely polls, requests, or collects information from the client 102. The collection agent 304, script and/or program may be part of an endpoint auditing (EPA) system or solution for collecting attributes of an endpoint device, such as the client 102.

EPA may incorporate one or more of endpoint analysis, endpoint scanning and endpoint detection. An EPA solution can perform a range of security, identity, and device integrity checks on a client 102 prior to making an AAA and/or traffic management decision. An EPA solution may, for example, scan a client 102 for file and registry settings, and check that no unauthorized, illegal, or unlicensed executable code (including spy-ware, mal-ware, and trojans) is introduced. An EPA solution, when used in an embodiment of the system 500, may also incorporate all or part of any embodiment of the endpoint detection and scanning techniques and/or components described above in connection with FIG. 3. One embodiment of an EPA solution is the CITRIX Access Gateway Advanced Endpoint Analysis Software Development Kit (Endpoint Analysis SDK). Other embodiments of EPA solutions includes solutions from EPA FACTORY and EXTENTRIX.

In further details of FIG. 5, the appliance 200 may operate or execute one, both or none of the TM vServer and the authentication vServer. In some embodiments, the authentication vServers executes on a first appliance or a first group of appliances 200*a*, and the TM vServers executes on a second appliance or a second group of appliances 200*b*. In one embodiment, the appliance 200 is configured, designed and constructed to use a proprietary or custom protocol and/or communication model. In another embodiment, the appliance 200 may support one or more protocol and/or communication models. The appliance 200 can include or communicate with one or more policy engines 236. In some embodiments, the traffic management and/or authentication services each operates or executes on one or a combination of the user space 202 and kernel space 204 of one or more appliances 200. The TM vServer and the authentication vServer may reside in one or more servers 106 and/or intermediaries 200 over a network 104, as discussed in connection with FIGS. 4A-E. The TM vServer and/or the authentication vServer may include or communicate with the one or more policy engines 236.

Policy Engine

The one or more policy engines 236 may each reside on any component of the system 500. Each of the one or more policy engines 236 can be any embodiment of the policy engine 236 described above in connection with FIG. 2A. Further, each policy engine 236 can be statically or dynamically bound to one or more policies or sets of policies, such as the traffic management policies 586 and the authentication policies 568. In addition, the one or more policy engines 236 may identify one or more policies for the TM vServer and the authentication vServer. In some embodiments, the one or more policy engines 236 applies the one or more policies for the TM vServer or the authentication vServer and sends one or more results from the application to the TM vServer or the authentication vServer. In other embodiments, the one or more policy engines 236 sends the one or more identified policies to the TM vServer and/or the authentication vServer.

Storage Device

The appliance 200 may include a storage device 560. The storage device 560 may be any embodiment of the storage device described above in connection with FIG. 1E, the main memory 122 or cache 140 described above in connection with FIG. 1F, and the memory 264 described above in connection with FIG. 2A. The storage device 560 can store any type or form of information, including persistent information (e.g., client information persistent over an authentication session) and temporary information (intermediate data generated during runtime). In some embodiments, the storage 560 may store one or more URLs, such as URL associated with client requests. The storage device 560 may also store a domain, address, locator, index or other identifier of a machine or vServer 275, such as the domain of the TM vServer. The storage device 560 may also store one or more policies, such as traffic management policies 586 and authentication policies 568. Further, the storage device 560 may store a AAA-TM session table tracking or logging AAA and traffic management transactions.

Policies

The traffic management policies 586, the authentication policies 568 and the one or more policy engines 236 (hereafter generally referred to as "policy" or "policy engine 236") may include any form and type of policies, rules, procedures, requirements, instructions, guidelines and recommendations applied and/or output in response to a set of inputs and/or conditions. Some of the traffic management policies 586 and/or the authentication policies 568 may be persistent, for example, over a connection session or an authentication session, indefinitely or over a fixed period of time. Some of the traffic management policies 586 and/or the authentication policies 568 may be persistent until an occurrence of an event. Some of the traffic management policies 586 and the authentication policies 568 may be static, predefined by an administrator or generated by machine. Some of the traffic management policies 586 and the authentication policies 568 may be dynamic, for example, adapting or adjusting according to conditions including any combination of conditions of the network, traffic patterns, server loads, access frequency and access history. Moreover, some of these policies may be modified and/or generated by other policies.

The traffic management policies 586 and the authentication policies 568 may reside in one or more storage devices anywhere in the network 104. Such a storage device may be any embodiment of the type of storage described in connection with FIG. 1E, the main memory 122 or cache 140 described in connection with FIG. 1F, the memory 264 described in connection with FIG. 2A, and the storage device 560 described in connection with FIG. 5. In some embodiments, the traffic management policies 586 and the authentication policies 568 reside together, such as in the appliance 200 and/or the storage device 560. In other embodiments, these policies can include groups of policies separated geographically or logically, such as policies distributed accordingly to the configurations described above in connection with FIGS. 4A-4E.

The traffic management policies 586 may include any policy that directly or indirectly affects traffic management activities and/or decisions. For example, the traffic management policies 586 may include policies applied in conjunction with non-traffic-management policies (e.g., authentication policies 568) to make traffic management decisions. Further, traffic management policies 586 can include any policy relating to 1) traffic routing, redirection, addressing, distribution, 2) selection or assignment of server, server-farm, gateway, client, vServer, appliance or other network components, 3) traffic data encryption, compression, acceleration, buffering and other types of processing, 4) traffic overflow support, 5) network or network component failure support, 6) traffic data collection, analysis, reporting, and 7) management of service level.

The authentication policies 568 may include any policy that directly or indirectly affects AAA activities and/or decisions. For example, the authentication policies 568 may include policies applied in conjunction with non-AAA policies (e.g., traffic management policies 586) to make an AAA decision. In some embodiments, the authentication policies 568 may include any policy associated with security and access control features such as secure sockets layer (SSL), virtual private network (VPN), firewalls, encryption, watermarking, security keys, user or client registration, contextual access level, and EPA. The authentication policies 568 can support all or any subset of the features supported by the authentication vServer and the associated authentication servers 580.

In some embodiments, authorization and/or auditing/accounting policies are grouped apart from authentication policies, either logically partitioned or physically stored in different storage devices. One or more of the authentication, authorization and/or auditing/accounting policies may be applied before, after, or in conjunction with another of these policies. Any one of these AAA policies may be applied upon certain occurrences, satisfaction of conditions, or invoked by another policy. Moreover, any one of these AAA policies may be associated with or bound to an AAA or authentication vServer. Further, any of these AAA policies may be associated with or bound to a TM vServer via the AAA or authentication vServer, for example, according to any embodiment of the configurations described above in connection with FIGS. 4A-4E.

An authorization policy associated with or bound to the TM vServer may be applied in response to a request from a client 102. In some embodiments, an authorization policy may be applied after the client 102 has been authenticated. In one of these embodiments, authorization policies bound to the TM vServer is applied to associated traffic after the client 102 has been authenticated. An authorization policy may be associated with or bound to a user, group, vServer or global level. In some embodiments, authorization policies bound to certain levels may be supported or preferred. For example, in one embodiment, support for authorization policies at the TM vServer level may be readily supported since all traffic is directed to the TM vServer. A presence or absence of a first level of authorization policies may also affect support for a second level, because of conflicts, redundancy, synergy or otherwise. For example, if policies at a group level, such as content-filter policies are already supported, this may conflict with or be preferred over policies at the vServer level. For example, in some embodiments, a decision to support group-level policies, such as a default authorization group for VPN features, may be evaluated in view of existing or alternative global authorization policies on various traffic management features.

In some embodiments, authentication, authorization and auditing features are segregated and/or provided by different vServers. For example and in one embodiment, authentication policies may be bound to the authentication vServer and applied during authentication session establishment to validate user credentials. After the session is established, the session may become disassociated with the authentication policies, while authorization policies bound to a given user or group may be introduced. These authorization policies may then be evaluated at runtime to make a determination against each given request. Therefore, in some embodiments, there may be no overlap between authentication an authorization policies.

An auditing policy may have properties or characteristics substantially similar to an authentication or authorization policy. An auditing policy may be bound to one or more of a TM vServer, an authentication session, and a traffic management session. Features provided by any form or type of AAA or authentication vServers and servers may be supported by auditing policies. Auditing features supported may include support for the following, although not limited by:

- a full or customized audit trail of traffic management end-users in a number of protocols including TCP, UDP and HTTP;
- a full or customized audit trail of system administrators and traffic management end-users, such as logging commands and tracking role-based administration;
- SYSLOG and/or high performance TCP logging;
- system events logging;
- rich detail support;
- scriptable or customizable logging formats;
- policy-based auditing of various granularities; and
- AAA-for-TM-specific auditing.

Policies can be set at a user, group, vServer, global or other level, or set for multiple levels. Certain levels or groups of levels may be supported in various embodiments of the invention. In some embodiments, any existing framework for policy levels (e.g., of authentication policies) may be extended to a different set of policies (e.g., traffic management policies). For example, in one embodiment, new authentication policies for supporting traffic management can leverage on the existing user or group framework for auditing policies by inheriting the associated user or group definitions and databases. Priority amongst policies may be specified, in a hierarchical order or flat. In some embodiments, there is a flat priority space for policies. The order of policies to be evaluated, for certain policies such as traffic management policies, may be determined at configuration time. An ordered list of such policies may be maintained after determination and applied across a plurality of authentication sessions, for example. Priority ordering of some other policies may be determined at runtime. The policy level in which an policy falls into may determine whether priority ordering is determined at runtime or during configuration.

In further details of FIG. 5, the policies and vServers discussed above can operate to process a client request for access to a server 106. This request is processed over a plurality of transactions involving a plurality of requests and responses between the client 102, the TM vServer and the authentication vServer. The requests and responses can be any type or form of message in any communication protocol, proprietary or otherwise. In some embodiments, the message may be in HTTP, HTTPS or a similar protocol. These messages can include any type or form of information, such as information associated with the client 102, a requested resource, the appliance 200, and the authentication session 567.

Request 511

In some embodiments, the client 102 initiates a request 511 that is intercepted or routed to the TM vServer. This request 511 may include a URL 545. The URL 545 may be a pointer to a resource or an identifier for a server 106 to connect to. In some embodiments, the request 511 may not include the URL 545. The request 511 can also include information such as the address of the intermediary or appliance 200, and information that identifies policies and/or authentication servers to use. Further, the request 511 can include information indicating whether the client 102 is authenticated and/or whether authenticated access is needed. For example, in some embodiments, the request 511 may include a domain session cookie. If the domain session cookie is valid, this can indicate that the client 102 and/or user sending the request 511 has been authenticated. Authentication or re-authentication may be performed if the domain session cookie is invalid, or if the associated authentication session associated with the domain session cookie has expired.

Domain Session Cookie

The domain session cookie can provide authentication session information, such as an index or identifier 546 to a valid authentication session. The domain session cookie can be used to keep track of state information of authenticated traffic going through the traffic management vServer. In one embodiment, if a request 511 received at the traffic management vServer includes a valid domain session cookie, an associated authentication session 567 will be "refreshed" or stay active for another predetermined period of time. In one embodiment, a domain session cookie includes one or more of the following information:

Cookie name
Cookie value: <Authentication session index>
Domain: <traffic management vServer domain>
Path
Expiration time: <value/unset/default>

In some embodiments, the authentication session 567 may be created before authentication. In one of these embodiments, exposure of the domain session cookie may cause certain security issues, and traffic received by the traffic management vServer may have to be securely protected. In another of these embodiments, exposure of the domain session cookie raises no security issues. In other embodiments, the authentication session is created upon or after authentication. For example, in one of these embodiments, the authentication session is created responsive to authentication.

Response 521

Referring again to FIG. 5, and in further details, the TM vServer can initiate a response 521 responsive to the request 511. In some embodiments, the response 521 is a 200 OK HTTP response. The response 511 may include a page or form for display at the client 102. The response 511 may also include any number, type and form of fields, buttons and other widgets for display and/or user interaction. The response 521 may include the URL 545. In some embodiments, where the request 511 does not include any URLs, the response 521 can include a URL 545 that may be generated by the TM vServer. This URL 545 may be generated at least in part from information included in the request 511 and/or application of one or more traffic management policies 545. The URL 545 may be included in the response 521 in a hidden form or hidden field. In some embodiments, the input type of such a hidden field or form is specified as "HIDDEN". A document, such as a html document, associated with a hidden form or field may not show the hidden form or field, nor the value or content of the hidden form or field, when displayed in a browser. In some embodiments, a user presented with the document may not interact with the hidden form or field. The response 521 may also include a submit-on-load event handler. The submit-on-load event handler may include any collection of commands, or any form or type of script or program, that initiates or triggers a message upon a predetermined event. For example, a message to submit the hidden form or field may be triggered when a user clicks on a "submit" button.

The response 521 may include instructions 514 to redirect the request 511 to an authentication server. The instructions 514 may be generated by the TM vServer, generated at least in part from information included in the request 511 and/or application of one or more traffic management policies 545. The instructions 514 can include any type or form of commands, such as HTTP commands, or any type or form of program code. Further, the instructions 514 may be customized to the type or capabilities of the client 102. In some embodiments, the instructions 514 may include or be included in a script 516. The script 516 may be executed by the client 102, or may be self-executing when received at the client 102. The script may be an event handler. In other embodiments, the script 516 may be independent from the instructions and/or serve a different purpose. The script 516 may trigger, generate or otherwise initiate a second or additional request 512 by the client 102.

Request 512

In some embodiments, the request 512 is used for passing or redirecting the URL 545 and/or other information to a destination, such as the authentication vServer. In other embodiments, a 302 response may replace the response 521 in passing the URL 545 and/or other information to the destination. The request 512 may include a redirect location header. The redirect location header may include any type or form of information, such as information for retrieving a login page. In one embodiment, the redirect location header can have the following format:

Location: <http|https>://<vpn_vServer>:<port>/vpn/index.html

In some embodiments, the request 512 is triggered by a user action, such as a mouse-click on a submit button associated with the response 521 received at the client 102. In other embodiments, the request 512 automatically triggers when the response 521 is received at the client 102. In one embodiment, the script 516 may generate a request 512 as a POST message. In some embodiments, a POST message is able to include more content, such as a longer URL, than a 302 redirection message can include in its HTTP header for example. The POST message may include a URL 520. The URL 520 of the request 512 may be a pointer to any type or form of a script, executable file, program or resource. In some embodiments, the URL 520 may point to a directory, directory tree or location of a script or executable file. In one of these embodiments, the URL 520 is a pointer to a CGI executable file. The URL 520 may point to a CGI binary directory or directory tree containing a CGI executable file. The URL 520 may include a string, such as "/cgi/tm". This string may indicate that the response 521 is a redirection message from the TM vServer. In some embodiments, the URL string, such as "/cgi/tm", may be hard-coded, pre-determined or dynamically generated. The URL 520 may also be some other type or form of pointer or indicator other than a URL.

The request 512 may include any type or form of information, such as information associated with the client 102, any requested resource, the appliance 200, the authentication session 567, and the request 511. The request 512 may also include the URL 545. In some embodiments, the request 512 may include the URL 545 in the body of the request 512. The request 512 may also include client and/or user credentials 518. In some embodiments, the credentials 518 are used for authenticating the client 102 and/or user. In various embodiments, one or more of the credentials 518, the URL 545 and the URL 520 may be optional or required. One or more of these may reside in the body of the request 512, in a POST request line of the request 512, in a header, or other section of the request 512. In one embodiment, the request 512 includes, but is not limited by, any one or more of the following attributes:

Request line: POST/cgi/tm
Host: <authentication vServer identifier or locator>
Body: url=<URL 545>

The request 512 may include any type or form of marker or cookie, such as an AAA cookie. An AAA cookie may be generated by the TM vServer, the client 102, or any other module of system 500, and/or in accordance with one or more policies 586, 568. The AAA cookie may be used to perform any type and form of state and/or data tracking during the authentication process. The AAA cookie can include one or more attributes, and each attribute may include any type or form of information, such as information about the authentication vServer and an associated authentication session 567. An AAA cookie may be reused during the period of authentication. An AAA cookie may expire when an authentication session 567 expires. In some embodiments, the AAA cookie is only valid for the domain of the authentication vServer 275av and may not be available in requests sent to the TM vServer. In one embodiment, an AAA cookie includes, but is not limited to, the following attributes:

Cookie name
Cookie value
Domain: <Authentication vServer>
Path
Expiration time

Authentication Session

In some embodiments, an authentication session 567 may be created in response to the request 512. The authentication vServer 275av may establish an authentication session to authenticate a client 102 and/or user when a connection or resource request is made, and in some embodiments, after an authentication session has expired. The authentication session 567 may represent any type or form of connection, channel, session, collection or unit of transactions. Further, the authentication session 567 can support any session layer services and protocols. An authentication session may also be substantially similar to or incorporates features of any existing type of secure, authenticated, and/or encrypted session, channel or connection.

In some embodiments, an authentication session 567 is a VPN session. An authentication session 567 may be a VPN session if created by a VPN vServer or server. In some embodiments, an authentication session 567 is substantially similar to and/or incorporates features of a VPN session. As an example, in one embodiment, authentication may be provided by integrating a light weight VPN framework so that future VPN enhancements, such as security assurance markup language (SAML) and active directory federation services (ADFS), can be incorporated. In another embodiment, the authentication session 567 includes additional fields, such as fields to store the domain of an associated TM vServer and the URL 545.

An authentication session may be created right after an authentication vServer 275av receives a first client request redirected from the TM vServer. In some embodiments, this session creation may occur before authentication. A VPN vServer, however, may create a VPN session after authentication is completed. A reason for the difference may be that the authentication session is created before authentication to store one or both of the domain of the TM vServer and the URL of the initial request made by the client to the TM vServer. In some embodiments, protection of the authentication session against Denial of Service (DOS) attack may be needed or provided, for example against a hacker that sends a message to fill up a AAA-TM session table, denying access to legitimate users.

In some embodiments, an authentication session can be refreshed, or made active for another specified period of time. In one of these embodiments, if a valid domain session cookie is found in the request 511 received at the traffic management vServer, the authentication session can stay active for another specified period of time. If not refreshed, the authentication session can time-out, and the client 102 may have to be re-authenticated (e.g., re-login). Session time-out may sometimes be referred to as passive time-out. An authentication session 567 can terminate either by a user's explicit logout (e.g., clicking the logout button/link) or when the session times-out. In some embodiments, once a user logs out, the authentication session (e.g., on the appliance 200, such as a CITRIX Netscaler appliance) becomes invalid. The user may have to be re-authenticated to enter into a valid authentication session. In one embodiment, CGI support for user logout may be supported. For example, an executable file that processes the logout may be found in a "/cgi/logout" path and linked to a logout button, for example. In another embodiment, a full session management page may be supported and displayed at the client 102, including logout functions. The full session management page may also be customized. This full session management page may be retrieved from storage and/or included in a message to the client 102.

In some embodiments, AAA support for traffic management may increase the authentication login rate and/or number of concurrent sessions. For example, these may be higher than typical VPN applications. This may also increase memory consumption. To offset such increases, an administrator may set smaller session timeout values, such as a smaller default timeout value for authentication sessions 567.

An authentication session 567 may or may not co-exist and/or interoperate with a traffic management session (not shown). In one embodiment, a traffic management session starts after an authentication session. In another embodiment, a traffic management session initiates and/or interacts with one or more authentication sessions. A traffic management session may also interoperate with an authentication session, for example, for auditing/accounting purposes during the traffic flow, access AAA feedback and/or make or update traffic management decisions. In some embodiments, a security model for authentication and/or VPN supporting traffic management may have session establishment and authentication token collection occurring over a secure channel (SSL) but may not require traffic management content to be secured. The authentication and/or VPN support can protect a traffic management vServer over traffic passing through it.

Response 522

A second response 522 to the client 102 may be generated if authentication of the client 102 is successful, for example, such that the authentication session 567 is available. The second response 522 may identify the authentication session 567 to the client 102. The authentication vServer may generate the second response 522, and may transmit the response 522 to the client 102. The second response 522 may include the authentication session identifier 546 or information in the body of the second response 522, in a POST message structure of the second response 522, in a domain session cookie, a header, or any other section of the second response 522. In some embodiments, an authentication session identifier 546 may be referred as an authentication session index 546. An authentication index 546 may be used to identify a valid authentication session.

In some embodiments, the second response 522 may be a HTTP 302 message, or any other type or form of redirection message. In some embodiments, the second response 522 may redirect the client request back to the TM vServer after authentication. In one embodiment, the second response includes, but is not limited to, any one or more of the following information and/or constructs:

Location header format:
Location: <protocol>://<traffic_management_vServer> [:<port>]/<url>

<protocol> and <port>: may depend on the traffic management vServer IP and service port;
< traffic_management_vServer >: may be copied from an authentication session, and may be originally from the domain cookie;
<url>: may be copied from authentication session, and may be originally from the initial request to the traffic management vServer.

domain session cookie:
    Cookie name
    Cookie value: <Authentication session index>
    Domain: <traffic management vServer domain>
    Path
    Expiration time: <value/unset/default>

Request 513

A request 513 may be sent by the client 102 to the TM vServer. In one embodiment, the request 513 may be a redirected second response 522, with or without any changes to the second response 522. In another embodiment, the request 513 is substantially similar to the request 511. For example, the request 513 may include information from the request 511 as well as authentication information. The request 513 may identify the authentication session 567. In some embodiments, the request 513 identifies the valid authentication session 567. The request 513 may include the authentication session identifier 546 or information in the body of the request 513, in a POST message structure of the request 513, or in a header or other section of the request 513.

Any of the responses 521, 522, and requests 512, 513, subsequent to a preceding message (request or response) may include any of the information included in any of the preceding message. For example, the response 521 may include all or some of the information included in the request 511. In some embodiments, any of the subsequent messages may be a modification or update of any preceding message. For example, the response 522 may be generated by putting a wrapper over the request 512, making header or address modifications in the request 512, and/or adding new information into the request 512. Moreover, each of these messages may be generated and/or modified from another message according to one or more traffic management, authentication or other policy.

An interface, such as a web interface may be provided by system 500. The interface may include features from any embodiment of the GUI 210, CLI 212, shell services 214 described above in connection with FIG. 2A. An administrator of the traffic management system may leverage on a plurality of commands to setup and configure the systems and methods discussed in the disclosure. Commands may be entered via a command-line interface, such as the CLI 212 as described above in connection with FIG. 2A. By way of illustration and in some embodiments, some or all of the following commands may be available for a variety of functions:

(a) Add a Authentication Virtual Server:

add authentication vServer <vServer name> <serviceType> <IPAddress> [<port>]

<vServer name>: name of the authentication virtual server.
<serviceType>: type of service, for example, SSL.
<port>: port number, for example, 443.

(b) Set/Unset CR/CS/LB Virtual Server:

```
set/unset cr\cs\lb vServer <vServer name>
    -authentication [on\off]
    -authenticationURL <FQDN of Authentication vServer> [<port>]
```

<vServer name>: name of the authentication virtual server.
-authentication [on|off]: this switch can enable or disable the authentication functionality for the traffic management vServer.
<FQDN of Authentication vServer>: the domain name or IP address of the authentication vServer.
<port>: the service port listening on the authentication vServer, which should be the same as the port specified on the authentication vServer. Port number, for example, 443.

(c) Bind Policies to Authentication Virtual Server

```
bind authentication vServer <vServer name>
    -policy <authNpolicy>|<sessionPolicy>
```

(d) Bind Policies to CR/CS/LB Virtual vServer

```
bind cr\cs\lb vServer <vServer name>
    -policy <auditPolicy>| <authorizationPolicy> ...
```

(e) Set Parameters

```
set tm sessionParameter
set vpn parameter
add/rm/set tm sessionPolicy/sessionAction
add/rm/set vpn sessionPolicy/sessionAction
set tm session parameter
    [-sessTimeout <mins>]
    [-defaultAuthorizationAction (ALLOW\DENY)]
    [-authorizationGroup <string>]
    [-homePage <URL>]
    [-clientSecurity <expression>
    [-clientSecurityGroup <string>]
    [-clientSecurityMessage <string>]]
    [-ssoCredential ( PRIMARY | SECONDARY )]
    [-loginScript <input_filename>] [-logoutScript <input_filename>]
    [-ntDomain <string>]
    [-(pre)authenticationPolicy/(pre)authenticationActions <string>]
set aaa param
    [-sessTimeout <mins>]
    [-defaultAuthorizationAction (ALLOW\DENY)]
    [-authorizationGroup <string>]
    [-homePage <URL>]
    [-clientSecurity <expression>
    [-clientSecurityGroup <string>]
    [-clientSecurityMessage <string>]]
    [-ssoCredential ( PRIMARY | SECONDARY )]
    [-loginScript <input_filename>] [-logoutScript <input_filename>]
    [-ntDomain <string>]
    [-(pre)authenticationPolicy/(pre)authenticationActions <string>]
set aaa sessionparams
    [-sessTimeout <mins>]
    [-defaultAuthorizationAction (ALLOW\DENY)]
    [-authorizationGroup <string>]
    [-homePage <URL>]
    [-clientSecurity <expression>
    [-clientSecurityGroup <string>]
    [-clientSecurityMessage <string>]]
    [-ssoCredential ( PRIMARY | SECONDARY )]
    [-loginScript <input_filename>] [-logoutScript <input_filename>]
    [-ntDomain <string>]
    [-(pre)authenticationPolicy/(pre)authenticationActions <string>]
{defines the session behavior for TM sessions}
set vpn param
    [-sessTimeout <mins>]
    [-defaultAuthorizationAction (ALLOW\DENY)]
    [-authorizationGroup <string>]
    [-homePage <URL>]
    [-clientSecurity <expression>
    [-clientSecurityGroup <string>]
    [-clientSecurityMessage <string>]]
    [-ssoCredential ( PRIMARY | SECONDARY )]
    [-loginScript <input_filename>] [-logoutScript <input_filename>]
    [-ntDomain <string>]
    [-(pre)authenticationPolicy/(pre)authenticationActions <string>]
defines the session behavior of VPN sessions}
```

(f) Display Statistics:

```
show aaa session
    {shows the sessions and their statistics, including
    VPN, traffic management and/or system.}
```

Figure 6A:
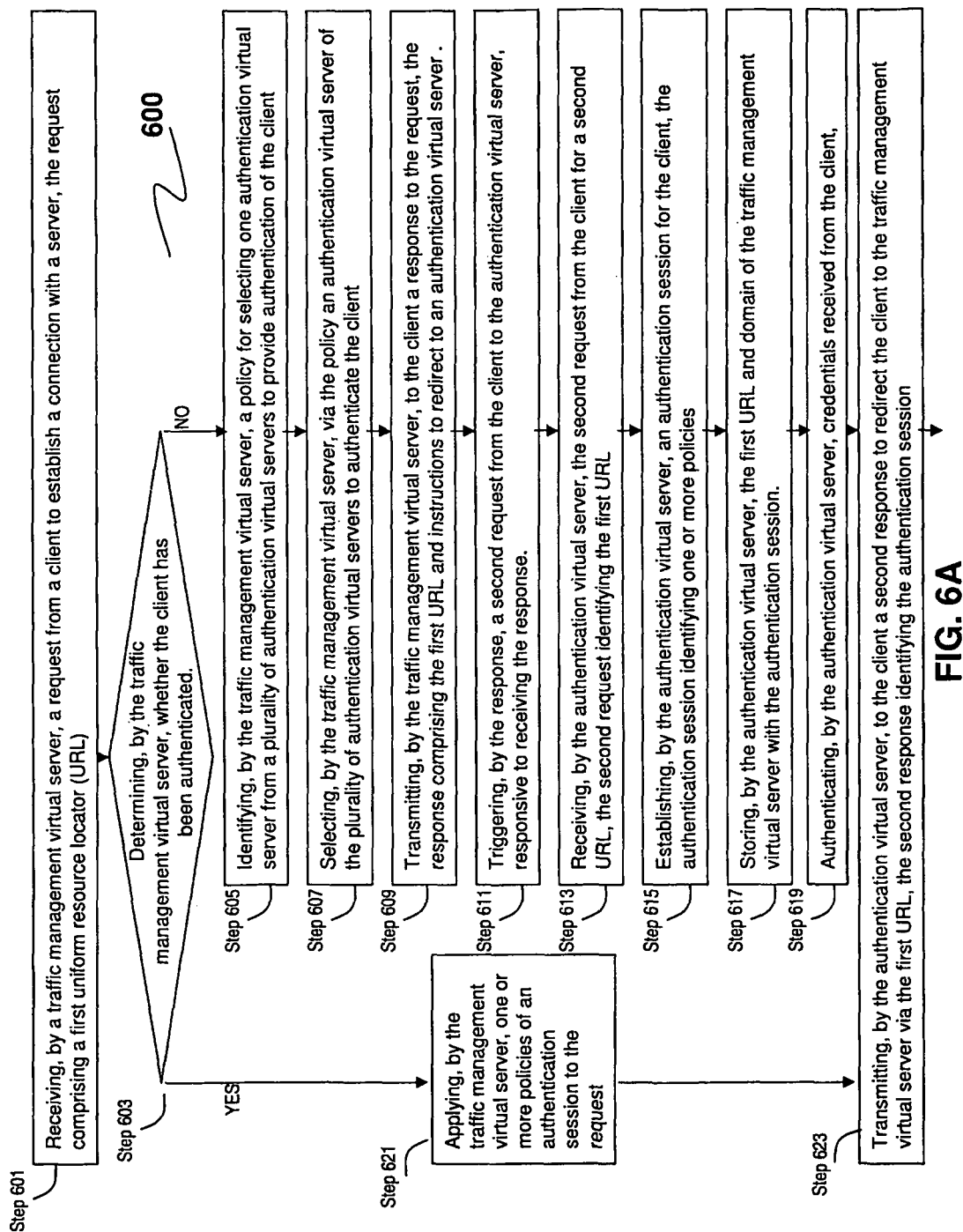
FIG. 6A-6B are flow diagrams of an embodiment of steps of a method for providing AAA support for traffic management.
Figure 6B:
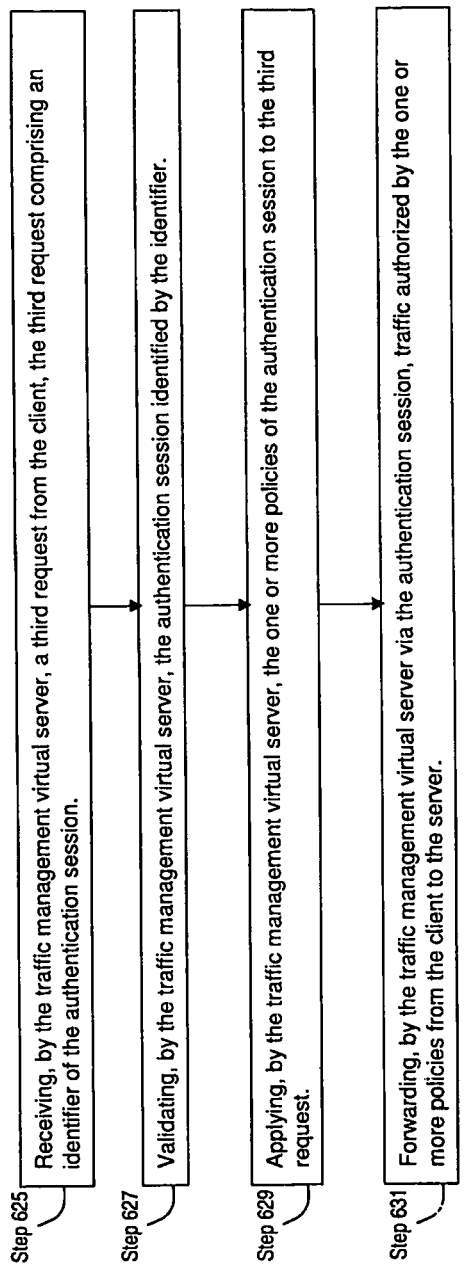

Referring now to FIGS. 6A and 6B, a flow diagram 600 depicting an embodiment of steps of a method of authentication of network traffic management by a traffic management virtual vServer is shown. In brief overview, at step 601, a traffic management vServer receives a request 511 from a client 102 to establish a connection with a server 106. The request 511 includes a first uniform resource locator (URL) 545. At step 603, the traffic management virtual server determines whether the client 102 has been authenticated. At step 605, the traffic management virtual server identifies a policy for selecting one authentication virtual server 275av from a plurality of authentication virtual servers 275av to provide authentication of the client 102. At step 607, the traffic management virtual server selects an authentication virtual server 275av of the plurality of authentication virtual servers 275av via the policy. At step 609, the traffic management virtual server transmits to the client 102 a response 521 to the request 511. The response 521 includes the URL 545 and instructions 514 to redirect to an authentication virtual server 275av. At step 611, the response 521 triggers a request 512 from the client 102 to the authentication virtual server 275av. At step 613, the authentication virtual server receives the request 512 from the client 102. The second request identifies the URL 545 and indicates a redirection from the traffic management virtual server. At step 615, the authentication virtual server establishes an authentication session 567 for the client 102. The authentication session 567 identifies one or more policies 568. At step 617, the authentication virtual server stores the URL 545 and domain of the traffic management virtual server 275tv with the authentication session 567. At step 619, the authentication virtual server authenticates credentials received from the client 102. At step 621, the traffic management virtual server applies one or more policies 568 of an authentication session 567 to the request 511. At step 623, the authentication virtual server transmits a response 522 to the client 102 to redirect the client 102 to the traffic management virtual server. The response 522 identifies the authentication session 567. At step 625, the traffic management virtual server receives a request 513 from the client 102. The request 513 includes an identifier 546 of the authentication session 567. At step 627, the traffic management virtual server validates the authentication session 567 identified by the identifier 546. At step 629, the traffic management virtual server applies the one or more policies 568 of the authentication session 567 to the request 513. At step 631, the traffic management virtual server forwards traffic authorized by the one or more policies 568 from the client 102 to the server 106.

In further details of step 601, a traffic management vServer receives a request 511 from a client 102 to establish a connection with a server 106. The request 511 may include a uniform resource locator (URL) 545. In some embodiments, the request 511 is a request for access to a resource. The request 511 may be an initial request 511 from the client, from a plurality of requests, and may or may not include the URL 545. The traffic management vServer may receive the request 511 via another intermediary between the client 102 and a server 106 or server farm 582, such as the appliance 200. The request 511 may be intercepted and/or redirected to the traffic management vServer. The request 511 may also be redirected and/or addressed to the appliance 200 or server 106 executing the traffic management vServer. In some embodiments, the request 511 may be addressed to the traffic management vServer. The request 511 may be directed to the traffic management vServer according to one or more policies, such as policies from the traffic management policies 586. In addition, the request 511 may be channeled, routed, redirected, or delegated from one or more traffic management vServers 275*tmv* to the traffic management vServer 275*tv* via any embodiment of the configurations described above in connection with FIGS. 4A-4E.

In further details of step 603, the traffic management virtual server determines whether the client 102 has been authenticated. The traffic management vServer may determine whether client 102 and/or user has been authenticated by applying one or more policies, such as policies from the traffic management policies and/or authentication policies 568 associated with the traffic management virtual server. In some embodiments, the request 511 may include information that indicates whether the client 102 and/or user are authenticated. The absence of certain information may also indicate whether the client 102 and/or user are authenticated. The traffic management vServer may determine that the request does not include a session cookie, such as a domain session cookie. In some embodiments, the traffic management vServer may determine that the request does not include an identifier or index 546 to a valid authentication session. In one embodiment, the traffic management vServer may determine that the client 102 and/or user is not authenticated because the request 511 does not include a domain session cookie and/or an index to a valid authentication session. A valid domain session cookie and/or an index to a valid authentication session in the request 511 may indicate that the client 102 and/or user is authenticated. In one embodiment, the traffic management vServer checks that an authentication session, either identified in the request 511 or by the session domain cookie, is valid or has not expired. In some embodiments, the traffic management vServer determines that the client 102 and/or user is authenticated if the request 511 includes a valid domain session cookie and the associated authentication session is valid and has not expired.

The traffic management vServer may also request the client 102 for information. The requested information can be used to determine whether the client 102 and/or user is authenticated. For example, the traffic management vServer may initiate an endpoint analysis scan of the client 102. In some embodiments, the traffic management vServer may transmit a script and/or program to the client 102 to collect the information, or may execute a script and/or program to poll or request the client 102 for the information. In some embodiments, the traffic management vServer may transmit and/or activate a collection agent 304 in the client 102 to collect the information for the traffic management vServer. The information collected may be any type or form of information described above in connection with the collection agent 304 and FIGS. 3A and 5. The traffic management vServer may then determine whether the client 102 has been authenticated in response to receiving and/or analyzing the collected information.

In some embodiments, the traffic management vServer may not be able to determine whether the client 102 has been authenticated. In one of these embodiments, the traffic management vServer may treat the client 102 as authenticated. In another of these embodiments, the traffic management vServer may treat the client 102 as not authenticated. The traffic management vServer may treat the client 102 as authenticated or not by applying one or more policies, such as the traffic management policies 586 and the authentication policies 568. Depending on whether the client 102 has been authenticated or not, the traffic management vServer may perform a same action or different actions. The actions may be determined by applying one or more policies. In one embodiment, if the client 102 is authenticated, the method may proceed to step 621 for application of one or more authentication policies 568 prior to traffic management operations. In another embodiment, if the client 102 is not authenticated, the method may proceed to step 605 to initiate authentication.

At step 605, the traffic management virtual server identifies a policy for selecting one authentication virtual server from a plurality of authentication virtual servers to perform authentication on the client 102. One or more policies, for example traffic management policies 586, may be selected and applied in selecting the authentication vServer. In some embodiments, only one authentication virtual server may be available or supported, and a policy may not be required to identify this authentication virtual server. In one embodiment, the request 511 includes information for identifying the policy for selecting the authentication virtual server. In another embodiment, the request 511 provides the policy for selecting the authentication virtual server. In yet another embodiment, traffic management virtual server identifies the policy based at least in part on the collected information from the client 102. Further, the policy may be identified from the traffic management policies 586, the authentication policies 568, or any other policies. Any policy may be applied through a policy engine, such as any embodiment of the policy engine 236 discussed above in connection with FIG. 2A.

In one embodiment, the traffic management virtual server identifies the policy to select the authentication vServer based on a user associated with the request. In another embodiment, the traffic management virtual server identifies the policy to select the authentication vServer based on information collected from the client 102. The traffic management virtual server can identify the policy based on any type or form of information collected from the client 102. The traffic management virtual server may initiate EPA to collect information from the client 102 for identifying the policy. The traffic management virtual server may receive information from the client 102 for identifying the policy by sending a collection agent 304 to the client 102 or communicating with a collection agent 304 at the client 304. In one embodiment, the traffic management virtual server identifies the policy for selecting the authentication vServer based on information collected about software installed on the client 102. In another embodiment, the traffic management virtual server identifies the policy for selecting the authentication vServer based on information collected about an operating system on the client 102.

In some embodiments, the traffic management vServer may operate via an associated policy engine 236 for any action relating to a policy. For example, a policy engine 236 in traffic management vServer or in communication with the traffic management vServer may identify the policy for selecting the authentication vServer on behalf of the traffic management vServer.

In further details of step 607, the traffic management vServer selects an authentication vServer of the plurality of authentication vServers via the policy to authenticate the client. Responsive to identification of the policy, the traffic management vServer selects an authentication vServer. In one embodiment, the traffic management vServer selects an authentication vServer from a plurality of vServers associated with the traffic management vServer. In another embodiment, the traffic management vServer selects an authentication vServer as a first type of authentication vServer from a plurality of vServers. The traffic management vServer may select the authentication vServer based on a type of authentication supported by the authentication vServer. For example, the type of authentication may include Active Directory (AD), Lightweight Directory Access Protocol (LDAP), RADIUS and RSA SecureID. The traffic management vServer may also select the authentication vServer based on a feature (e.g., SSO) and/or option supported by a type of authentication provided by the authentication vServer. The authentication vServer may be selected for a particular type of authentication identified by the policy. The traffic management vServer can also select the authentication vServer based on negotiation of any type of requirement and/or options with the client 102. In one embodiment, the traffic management vServer selects an authentication vServer based on negotiating with the client 102 a type of authentication. The type of authentication may be negotiated from a plurality of types of authentication. In some embodiments, the traffic management vServer selects an authentication vServer based a type of authentication supported by the client.

In some embodiments, the traffic management vServer may select the authentication virtual server without applying any policies. For example, the traffic management vServer may be statically associated with the authentication vServer as described above in connection with FIGS. 4A and 4B. In one embodiment, the request 511 provides information that identifies or selects the authentication vServer. In another embodiment, the traffic management vServer uses information collected from the client 102 to identify or select the authentication virtual server. The traffic management vServer selects the one or more authentication vServers to authenticate the client 102 and/or the user. In addition, one or more authentication servers 580 may be statically or dynamically associated with each selected authentication vServer to authenticate the client 102 and/or the user. In some embodiments, the dynamic association may be made by applying one or more policies, from the authentication policies 568 for example.

In further details of step 609, the traffic management virtual server transmits to the client 102 a response 521 to the request 511. The traffic management virtual server may transmit the response 521 including the URL 545 and/or instructions 514 to the client 102 to redirect to the authentication virtual server. In some embodiments, the traffic management vServer transmits a response 521 identifying the URL 545 via a hidden form or field. The traffic management vServer may also transmit the response 521 including a submit-on-load event handler and/or a page or form for display and/or user interaction on the client 102. The traffic management vServer may transmit the response 521 if the client 102 and/or the user is not authenticated or if it cannot be determined if the client 102 and/or the user is authenticated.

In some embodiments, the traffic management vServer converts the request 511 into the response 521 via any type or form of modification, transformation and/or translation. In other embodiments, the traffic management vServer generates the response 521 based at least in part on the contents of the request 511. The response 521 may also be generated and/or modified by a module other than the traffic management vServer, such as a component of the appliance 200. Further, the response 521 may be generated and/or modified upon application of one or more policies, such as policies from the traffic management policies and/or the authentication policies 568. In some embodiments, the response 521 includes a script 516 to trigger transmission of a request 512 from the client 102 to the authentication virtual server.

In some embodiments, the traffic management vServer may operate or perform any actions via the network engine 240. The traffic management vServer may direct the network engine 240 on any such actions. For example, the network engine 240 may generate and/or transmit the response 521 to the client 102 to redirect to the selected authentication vServer. The network engine 240 can generate the response 521 on behalf of the traffic management vServer to include an instruction for the client 102 to redirect to the selected authentication vServer.

At step 611, the response 521 triggers a request 512 from the client 102 to the authentication virtual server responsive to receiving the response 521. In one embodiment, the request 512 is triggered responsive to receiving the response 521. In another embodiment, the request 512 is triggered by a user action, such as a click on a submit button displayed on the client 102. The client 102 may receive one or more commands, scripts and/or programs included in the response 521 that triggers the request 512. The client 102 may also have one or more scripts and/or programs that triggers a request 512 responsive to receipt of the response 521. In some embodiments, the one or more scripts and/or programs, either received by the client 102 or available at the client 102, triggers transmission of a POST request 512 to the authentication virtual server. The client 102 and/or the one or more scripts and/or programs may generate a pointer or URL 520 for inclusion in the request 512. For example, where the request 512 is a POST request, the pointer or URL 520 may be included in the POST field of the request 512. In some embodiments, the pointer or URL indicates a path to a CGI executable file. The client 102 and/or the one or more scripts and/or programs may generate one or more inputs or values to the CGI executable script for inclusion in the request 512. The request 512 may also include one or more commands, scripts and/or programs. In some embodiments, the client 102 transmits the request 512 to the authentication vServer. The request 512 may also be routed or redirected to the authentication vServer, for example via the appliance 200 and/or traffic management vServer.

In further details of step 613, the authentication virtual server receives the request 512 from the client 102, the request 512 identifying the URL 545 and indicating a redirection from the traffic management vServer. In some embodiments, the authentication vServer receives a request 512 comprising a POST message to a predetermined URL and/or the URL 545. The authentication vServer may extract the pointer or URL 520 from the request 512 in response to receiving the request 512. The authentication vServer may retrieve or request for an executable file according to the extracted pointer or URL 520. Further, the authentication vServer may execute the executable file, with or without inputs or values included in the request 512. In another embodiment, the authentication vServer may execute one or more commands, scripts and/or programs. The one or more commands, scripts and/or programs may be included in the request 512 or in the authentication vServer 275av, retrieved from storage 560, or generated according to one or more authentication policies 568. Furthermore, the authentication vServer may select the one or more commands, scripts, programs, and/or executable file for execution according to one or more authentication policies 568.

In some embodiments, the authentication vServer looks for an AAA cookie in the request 512. If an AAA cookie is available and valid, the authentication vServer may proceed to step 615 or any other authentication steps. If an AAA cookie is not available or invalid, the authentication vServer may determine if the request 512 is of a certain type of message and valid. In some embodiments, the authentication vServer may determine if the request 512 is a POST message. If the message is valid, the authentication vServer may proceed according to step 615. In some embodiments, the message is valid if it is a POST message. In one of these embodiments, the message is valid if the authentication vServer determines that the POST message includes a predetermined URL, such as "/cgi/tm". Otherwise, if the message is determined to be invalid and/or not a POST message, the authentication vServer may reject the client request. The authentication vServer may reject the client request by sending a message of any type and form. In some embodiments, the authentication vServer rejects the client request by a HTTP 403 Forbidden or 503 Service Unavailable message. In various embodiments, the authentication vServer may do one or more of generating the message to reject the client request, send the message to the client 102, and close the connection to the client 102.

In further details of step 615, the authentication virtual server establishes an authentication session 567 for the client 102. The authentication session 567 may identify one or more policies 568. The authentication session established by the authentication vServer may be a VPN session. In some embodiments, the authentication vServer establishes the authentication session 567 prior to authenticating the client 102 and/or the user. In other embodiments, the authentication vServer establishes the authentication session 567 upon authentication or after authenticating the client 102 and/or the user. The authentication vServer may create or establish the authentication session 567 using any type or form of data structure, objects or applications processing interfaces (APIs). For example, the authentication vServer may establish or create a session table, such as a AAA-TM session table in the storage device 560. The authentication vServer may also create and/or store a session cookie, such as a AAA session cookie, and/or other information associated with the authentication session 567. In some embodiments, the authentication vServer communicates or performs handshaking with a server 106 or other machine 102 to establish the authentication session 567. The server 106 or other machine 102 may be identified by the traffic management vServer based on the client request. In some other embodiments, the authentication vServer establishes the authentication session 567 in preparation to connect to a server 106 or other machine 102 yet to be identified by the traffic management vServer. The authentication vServer may also establish the authentication session 567 in preparation to authenticate the client 102 and/or user.

In some embodiments, the authentication session 567 may be established by executing the executable file indicated by the pointer or URL 520. The request 512 may pass information, such as inputs and values, to the authentication vServer 275av to establish the authentication session 567. The authentication session 567 may also be established by executing one or more commands, scripts and/or programs received in the request 512, residing in the authentication vServer 275av, retrieved from storage 560, or generated according to one or more authentication policies 568.

At step 617, the authentication virtual server stores the URL 545 and domain of the traffic management virtual server with the authentication session 567. The authentication vServer may store one or both of the URL 545 and domain of the traffic management virtual server in association with the authentication session 567. In addition, the authentication vServer can store any type or form of information, from the request 512 or otherwise, in association with the authentication session 567. The authentication vServer 275av may store any of these information responsive to receiving the request 512. The authentication vServer 275av may store any of these information responsive to applying one or more policies, such as policies from the authentication policies 568. Further, the authentication vServer 275av may store any of these information by executing the executable file indicated by the pointer or URL 520. The authentication session 567 may also store any of these information by executing the one or more commands, scripts and/or programs included in the request 512, residing in the authentication vServer 275av, retrieved from the storage device 560, or generated according to one or more authentication policies 568.

The authentication vServer may store any of this information in association with the client request, the client 102, the user and/or any other component of the system 500 described above in connection with FIG. 5. Any of this information may be stored in the storage 560, or between one or more storage devices in the network 104. In some embodiments, the authentication session 567 stores some or all of these information in a session table, such as a AAA-TM session table. The authentication vServer 275av may transmit or communicate any of this information to any of the storage devices for storage.

In further details of step 619, the authentication virtual server authenticates credentials received from the client 102. The authentication vServer may perform authentication in accordance with a type of authentication (e.g., LDAP, RADIUS) used by or configured by the authentication vServer. The authentication vServer may also communicate with any type or form of server or system to perform the type of authentication. For example, and in some embodiments, the authentication vServer performs a type of authentication supported by one or more authentication and/or authorization servers 580 bound or assigned to the authentication vServer. Further, the authentication vServer may perform authentication in accordance with a type of authentication identified by the traffic management vServer and/or one or more policies. The authentication vServer may also perform authentication of the client 102 and/or the user using any conventional, proprietary, and/or customized authentication techniques and processes. The authentication vServer may perform authentication responsive to receiving the request 512. The authentication vServer may also perform authentication responsive to applying one or more policies, such as policies from the authentication policies 568. Further, the authentication vServer may perform authentication by executing an executable file identified by the pointer or URL 520. The authentication session 567 may also perform authentication by executing the one or more commands, scripts and/or programs included in the request 512, in the authentication vServer, retrieved from storage 560, or generated according to one or more authentication policies 568.

The authentication vServer may identify or extract client credentials 518 and/or any type or form of information from the request 512. Further, the authentication vServer 275av may request for and/or collect any type or form of authentication and/or authorization information from the client 102 and/or the user. This information may include one or more of a user identification, password, answer to a challenge question, authentication key, session table index, and session cookie. The information may be collected in communication with one or more of a password manager on the client, a session table and/or database (maintained in the storage device 560 and/or a RADIUS server, for example) and user input. The authentication vServer may initiate an endpoint analysis or scan of the client 102. In some embodiments, the authentication vServer may transmit a script and/or program to the client 102 to collect the information, or may execute a script and/or program to poll or request the client 102 for the information. In one embodiment, a collection agent 304 collects the information for the authentication vServer. Any type or form of pre-authentication actions may also be performed by the authentication vServer. In some embodiments, the pre-authentication actions are applied according to one or more authentication policies 568.

In some embodiments, the authentication vServer redirects the client 102 or the client request to a login page or other webpage. The authentication vServer may initiate the redirection using a HTTP 302 message or any other type of message. In some embodiments, the authentication vServer generates the redirection message and transmits it to the client 102. In one embodiment, the authentication vServer 275av redirects the client 102 or the client request to the page via a pointer or URL, for example "/vpn/index.html". In some embodiments, some or all pre-authorization actions may be performed by accessing the page. This page may reside in, or be provided by the authentication vServer, the storage device 560, or any other component of the system 500 described above in connection with FIG. 5. In other embodiments, the authentication vServer sends or provides a page or a message to the client 102 to initiate authentication.

The client 102 may send a redirected request to the authentication server responsive to receiving the redirection message. In one embodiment, the client sends a redirected request including a "GET/vpn/index.html" command. The authentication server may send a response including a page, such as login page, to the client 102 responsive to the redirected request. The client 102 may enter credentials and/or other information into the page and send a login request, via the page, to the authentication server. The authentication vServer can receive and process the login request. In some embodiments, the authentication vServer 275av attempts to authenticate the client 102 and/or user either locally or remotely. For example, and in one embodiment, the authentication vServer 275av performs authentication locally by applying one or more authentication policies and/or using authentication information stored in the storage device 560. In another embodiment, the authentication vServer performs authentication by transmitting client and/or user information to one or more remote authentication servers 580. The selection of remote and/or local authentication may be based in part on the type or form of authentication configuration, and/or application of one or more authentication policies 568.

If the authentication is unsuccessful, for example if any of the authentication steps (615, 617 and 619) is unsuccessful, the client request may be rejected, ignored, or authentication re-performed with or without additional steps. The authentication vServer may reject the client request by sending the client 102 a message of any type and form. In some embodiments, the authentication vServer rejects the client request by a HTTP 403 message. In some embodiments, if the authentication is unsuccessful in any of the authentication steps, such as steps 615, 617 and 619, the authentication vServer may perform one or more of generating the message to reject the client request, sending the message to the client 102, and closing the connection to the client 102. The authentication vServer can terminate the authentication session 567, if available. Further, the authentication vServer 275av may remove the stored domain of the traffic management vServer 275tv and/or the URL 545 from storage.

If the authentication is successful, the authentication vServer may set the domain session cookie for the traffic management session. In some embodiments, upon successful authentication, the method may proceed to step 623 or 621.

In further details of step 621, the traffic management virtual server or the authentication virtual server applies one or more policies of an authentication session 567 to the request. In some embodiments, this step comes after the traffic management vServer has determined that the client 102 and/or user has been authenticated. The step may also proceed upon successful authentication of the client 102 and/or user by the authentication vServer. In some embodiments, the traffic management vServer transmits or redirects the client request to the authentication vServer. The traffic management vServer or the authentication virtual server can apply one or more policies, such as policies from the authentication policies 568, to the client request. The traffic management vServer or the authentication virtual server may apply the one or more policies on a client message, such as request 511, or on stored information associated with the client request (e.g., from storage device 560). The traffic management vServer or the authentication virtual server may identify an authentication session 567 associated with the authenticated client 102 and/or user. In addition, the authentication session 567 and/or the one or more policies may be identified by an authentication vServer associated with the traffic management vServer.

At step 623, the authentication virtual server transmits a response to the client 102 to redirect the client 102 to the traffic management virtual server. In some embodiments, the authentication vServer generates and transmits a response with the response 522 described above in connection with FIG. 5. The authentication vServer can insert the session cookie for the traffic management session in the response 522. Moreover, the authentication vServer can insert an identifier 546 or information about the authentication session 567 into the response 522. The authentication vServer can insert an identifier 546 or information about the authentication session 567 into a session cookie (e.g., domain session cookie) included in the response. The authentication vServer may send the response 522 to identify the authentication session 567 to the client 102. In some embodiments, the authentication vServer transmits the response 522 as a redirection message (e.g., HTTP 302 message) to the client 102 to redirect the client request to the traffic management vServer. Further, the authentication vServer may terminate its connection with the client 102 after sending the response 522.

In further details of step 625, the traffic management virtual server receives another request 513 from the client 102. The request 513 may include an identifier or index 546 of the authentication session 567. The client 102 may generate the request 513 responsive to receiving the response 522. The client 102 may extract the identifier 546 or information about the authentication session 567 from the response 522, and insert the identifier 546 or information about the authentication session 567 into the request 513. In some embodiments, the client 102 modifies or otherwise processes the response 522 into the request 513. The client 102 may transmit the request 513 directly to the traffic management vServer, or to the appliance 200 for redirection to the traffic management vServer. In some embodiments, the client 102 may perform any action, such as processing responses and generating requests, via one or more applications executing on or on behalf of the client 102. Performance of any of the actions may be automated and/or include user interaction. The requests sent by the client may be any type of request for access to server, such as via the use of an application.

In further details of step 627, the traffic management virtual server validates the authentication session 567 identified by the index or identifier 546. The traffic management vServer may extract or identify the index 546 or information about the authentication session 567 from the request 513. In some embodiments, the traffic management vServer uses the index 546 or information to identify the authentication session 567. Further, the traffic management vServer may validate the authentication session identifier 546 or information. In some embodiments, the traffic management vServer identifies one or more policies of the authentication session using the identifier 546 or information. The traffic management vServer may perform the validation by using information stored in the storage device 560, information collected from the client 102, and/or applying one or more policies from the associated traffic management policies 586 and/or authentication policies 568. The traffic management vServer may validate that the authentication session 567 is still active and/or is authenticated with respect to the client 102 and/or user.

In some embodiments, the traffic management vServer does not validate the authentication session 567. Responsive to a failure to validate the authentication session 567, the traffic management or authentication vServer may reject the client request by sending the client 102 a message of any type and form. In some embodiments, the traffic management or authentication vServer rejects the client request by a HTTP 403 message. The traffic management or authentication vServer may perform one or more of generating the message to reject the client request, sending the message to the client 102, and closing the connection to the client 102. The traffic management or authentication vServer may terminate the authentication session 567. Further, the traffic management or authentication vServer may remove the stored domain of the traffic management vServer and/or the URL 545 from storage 560. The traffic management or authentication vServer may also update and/or remove one or more session tables (e.g., from storage device 560), such as the AAA-TM session table.

In some embodiments, the traffic management vServer may use a validated authentication session 567 to perform EPA and/or obtain client 102 and/or user information. For example, upon authentication, the traffic management vServer can use the authentication session 567 to automatically and/or securely collect client 102 and/or user information. In some embodiments, the traffic management vServer uses the authentication session 567 to identify one or more policies 586, 568. For any communication traversing the traffic management vServer, the traffic management vServer may use any information about a client or a session available from the authentication vServer, such as any collected end point information. In some embodiments, the values of any portion of a policy expression may be obtained or derived from any data, values or information available via the authentication vServer, such as via an authenticated session. In some embodiments, the input to a condition, action or rule of a policy may be a value from end point collected information stored by the authentication vServer.

In this manner, a traffic management vServer may use end point or authenticate session information to direct traffic for any request. For example, during the communication of application traffic traversing the traffic management vServer, the traffic management vServer can use end point or authenticated session information to make traffic control decisions on a request basis. For example, if the client has the presence or absence of software, then the traffic management vServer may make certain traffic management decisions. If the client was authenticated by a certain type of authenticated versus another type of authentication, the traffic management vServer may also make certain traffic management decisions At step 629, the traffic management virtual server applies the one or more policies 586, 568 of the authentication session 567 to the request 513. The traffic management vServer may apply one or more policies 586, 568, for example, to validate the URL 545, to associate the URL 545 with the authentication session 567, or to determine a resource or server 106 for the client 102. In some embodiments, the traffic management vServer may apply an authorization policy of the one or more policies of the authentication session to the request 513. The traffic management vServer may apply the authorization policy to identify authorized traffic from the authenticated client 102. In some other embodiments, the traffic management vServer may apply a traffic management policy of the one or more policies of the authentication session to the request 513. The traffic management policy may determine that traffic associated with the authorized client 102 is encrypted and/or compressed.

The traffic management vServer may apply one or more policies 586, 568 to validate the URL 545 as a pointer to a resource or server 106 for the client 102. The traffic management vServer may also apply one or more policies 586, 568 to at least some of subsequent requests from the authenticated client 102 and/or user to validate these requests. Once validated by the one or more policies 586, 568, these requests become part of the authorized traffic.

At step 631, the traffic management virtual server forwards traffic authorized by the one or more policies 586, 568 from the client 102 to a server 106. The server 106 may be identified by the URL 545, by the traffic management vServer, or by applying one or more policies 586, 568. In some embodiments, the traffic management vServer forwards requests validated by the one or more policies 568 from the client 102 to the server 106. In one embodiments, the traffic management vServer may forward the authorized traffic or validated requests to a service 270 or server 106. In another embodiment, the traffic management vServer may forward the authorized traffic or validated requests via one or more traffic management sessions. In some embodiments, an authentication session may persist until a traffic management session is terminated. In other embodiments, a plurality of authentication sessions may be created and/or terminated during a traffic management session, for example to validate or authorize portions of traffic.

In various embodiments, one or more steps may be optional, required and/or re-sequenced without limitation in the methods described.

In one embodiment, the method 600 includes a traffic management virtual server determining from a request of a client to access a server that the client 102 has not been authenticated, the request comprising a URL 545 (step 603), transmitting to the client 102 a response 521 to the request 511, the response 521 comprising the URL 545 and instructions to redirect to an authentication virtual server (step 609), receiving by the authentication virtual server, a request 512 from the client 102, the second request identifying the URL 545 (step 613), authenticating credentials received from the client, establishing an authentication session for the client, the authentication session identifying one or more policies (step 619), transmitting to the client 102 a response 522 to redirect the client 102 to the traffic management virtual server via the URL 545, the response 522 identifying the authentication session 567 (step 623), and receiving, by the traffic management virtual server 275*tv*, a request 513 from the client 102, the request 513 comprising an identifier 546 of the authentication session 567 (step 625).

In another embodiment, the method 600 includes determining, by a traffic management virtual server, from a request 511 received from a client 102 to access content of a server 106 that the client 102 has not been authenticated (step 603), identifying a policy for selecting one authentication virtual server from a plurality of authentication virtual servers to provide authentication of the client 102 (step 605), selecting via the policy an authentication virtual server of the plurality of authentication virtual servers to authenticate the client 102 (step 607), and transmitting to the client 102 a response to the request 511, the response 521 comprising an instruction to redirect to the selected authentication virtual server 275*av* (step 609).

In still another embodiment, the method 600 includes a traffic management virtual server receiving a request 511 from a client 102 to establish a connection with a server 106 (step 601), determining that the client 102 has been authenticated (step 603), forwarding the request to an authentication vServer to apply one or more policies of an authentication session 567 to the request 511 (step 621), the authentication vServer transmitting a response 522 to the client 102 to redirect the client 102 to the traffic management virtual server (step 623), the traffic management virtual server receiving a request 513 from the client 102 (step 625), validating the authentication session 567 identified by the identifier 546 (step 627), applying the one or more policies 568 of the authentication session 567 to the request 513 (step 629), and forwarding traffic authorized by the one or more policies 568 from the client 102 to the server identified by the URL 545 via the authentication session 567 (step 631).

Figure 7A:
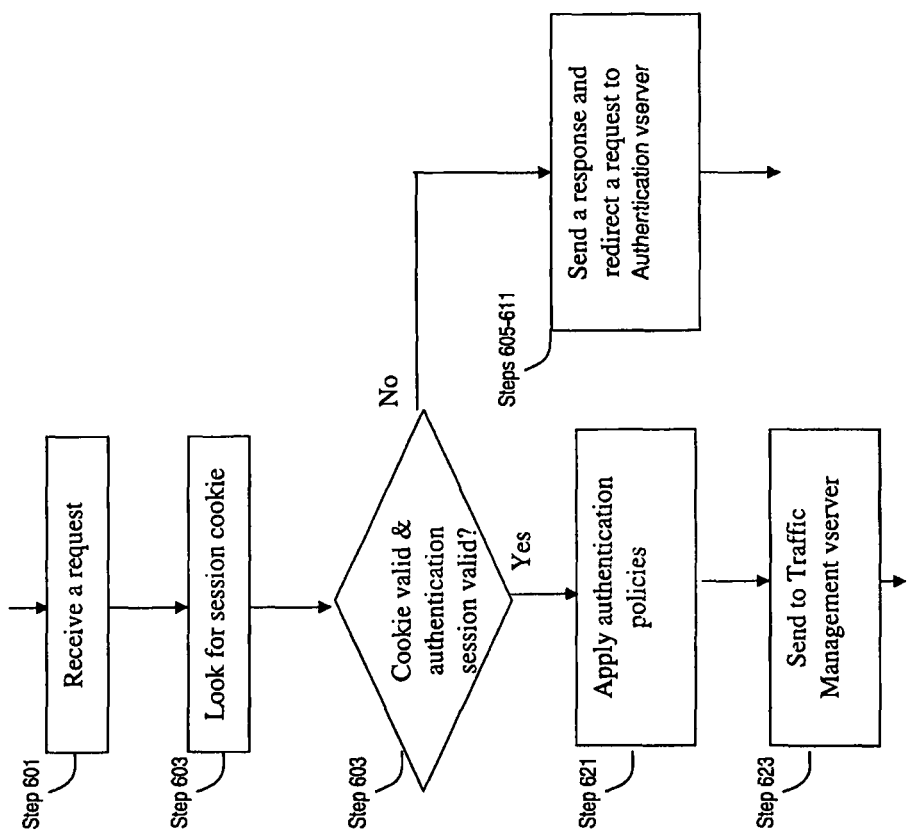
FIG. 7A-7B are flow diagrams of embodiments of steps of methods for providing AAA support for traffic management.

Referring now to FIG. 7A, yet another embodiment of a method of providing AAA support to traffic management is depicted. In further details, FIG. 7A illustrates an embodiment in which traffic is processed at a traffic management vServer in communication with one or more authentication vServers. The steps of FIG. 7A may represent a portion of the steps of method 600. Briefly, a traffic management virtual server receives a request 511 from a client 102 to establish a connection with a server 106 (step 601), looks for a session cookie in the request 511 to determine if the client 102 has been authenticated (step 603), forwards the request to an authentication vServer to apply authentication policies if the cookie and an authentication session it identifies are both valid (step 621), redirecting, by the authentication vServer back to the traffic management virtual server (step 623). If the cookie and/or a authentication session it identifies are not valid, the traffic management vServer identifies an authentication vServer to authenticate the client and redirects the client request to the authentication vServer (step 605), The details of each step are described above in connection with FIGS. 6A and 6B.

Figure 7B:
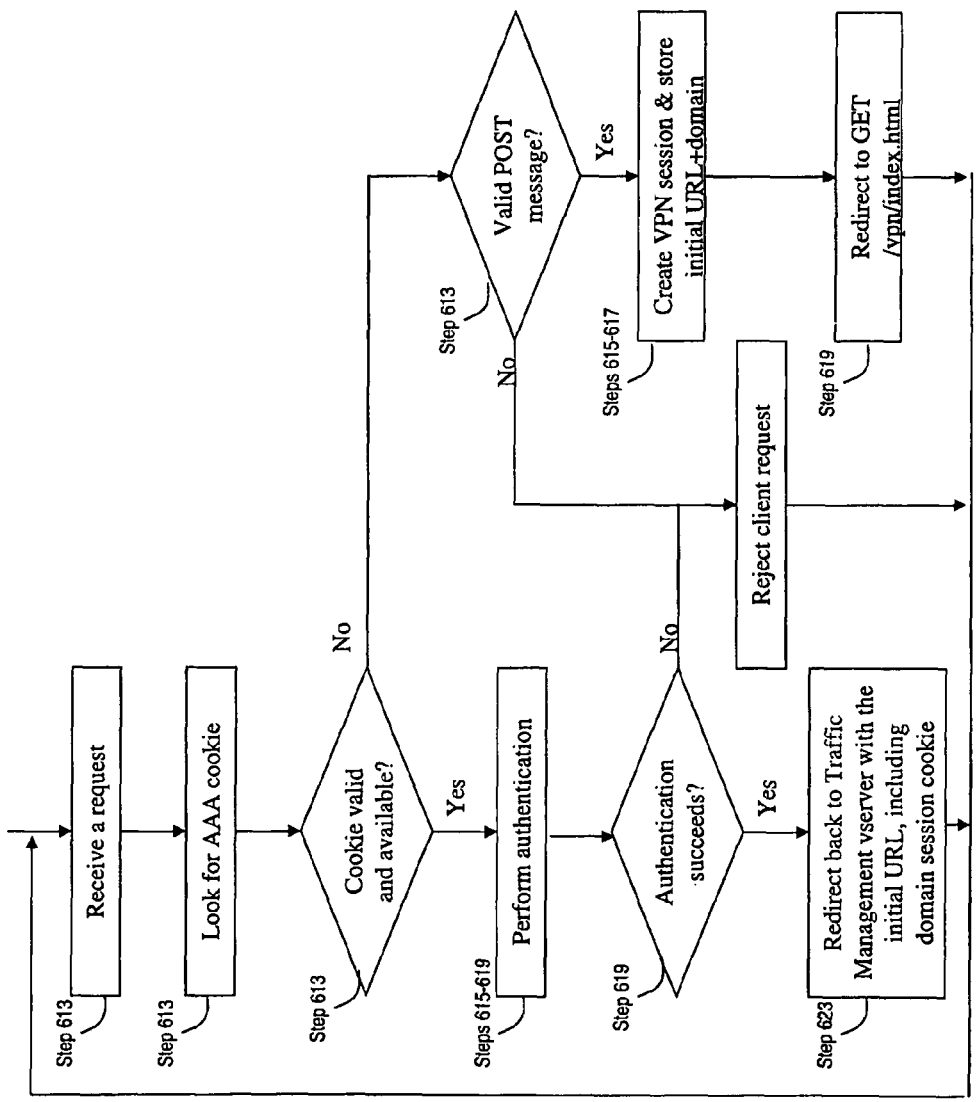

Referring now to FIG. 7B, still even another embodiment of a method of providing AAA support to traffic management is depicted. In further details, FIG. 7B illustrates an embodiment in which a client request is processed at an authentication vServer associated with a traffic management vServer. The steps of FIG. 7A may represent a portion of the steps of method 600. The details of each step are described above in connection with FIGS. 6A and 6B. Briefly, an authentication vServer receives the request 512 from the client 102 and looks for an AAA cookie in the request 512 (step 613). If the cookie is available and valid, the authentication vServer performs authentication on the client 102 (steps 615-619). If the authentication succeeds, the authentication vServer redirects the client request back to the traffic management virtual server (step 623). If the authentication fails, the client request is rejected. On the other hand, if the cookie if not available or not valid, the authentication vServer determines whether the request 512 is a valid POST message (step 613). If the request 512 is a valid POST message, an authentication session 567 is established and authentication performed (steps 615-619). If the request 512 is a valid POST message, the client request is rejected. The details of each step are described above in connection with FIGS. 6A and 6B.

Figure 8:
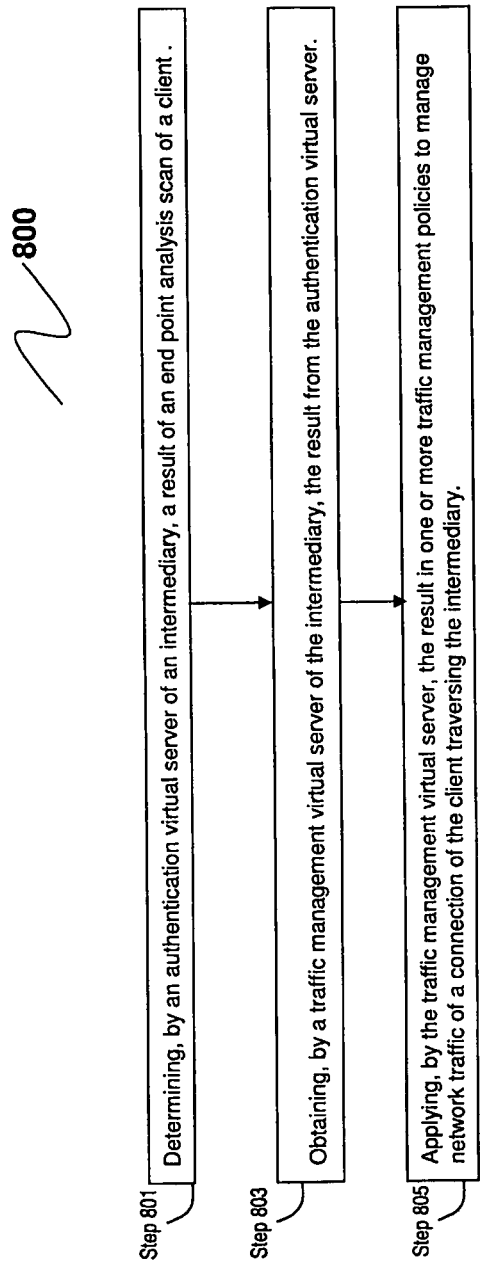
FIG. 8 is a flow diagram of an embodiment of steps of a method for managing traffic traversing an intermediary based on a result of endpoint auditing.

Referring now to FIG. 8, a flow diagram 800 depicting an embodiment of steps of a method for using endpoint auditing for traffic management is shown. In brief overview, at step 801, an authentication virtual server of an intermediary 200 determines a result of an end point analysis scan of a client 102. At step 803, the traffic management virtual server obtains the result from the authentication virtual server. At step 805, the traffic management virtual server applies the result in one or more traffic management policies 586 to manage network traffic of a connection of the client 102 traversing the intermediary 200.

In further details of step 801, an authentication virtual server of an intermediary 200 determines a result of an end point analysis scan of a client 102. One or more authentication and/or authorization servers 580 assigned or bound to the authentication vServer may determine the result of an end point analysis scan on behalf of the authentication vServer. In some embodiments, the authentication vServer initiates an endpoint analysis scan of the client 102 responsive to an event. The event may be any type and form of event, such as a receipt of a client request or client traffic, a change in an attribute of the client 102, a service level change, or a network disruption. The event may also be a request from a traffic management vServer or a different AAA vServer, such as an auditing vServer. In some other embodiments, the authentication vServer initiates an endpoint analysis scan based on a predetermined frequency. The predetermined frequency for initiating the endpoint analysis may operate according to a schedule. The frequency may be predetermined based on past history, such as past history of network traffic and/or client requests. The frequency may also be predetermined by applying one or more policies and/or formulas, for example, on the past history. Further, the frequency may be predetermined based on auditing/accounting needs. In some embodiments, the frequency is stored and/or maintained in a database and/or session table. The database and/or session table reside in one or more storage devices (e.g., storage device 560) in the network 104.

In some embodiments, the authentication vServer may transmit a script and/or program to the client 102 to perform the end point analysis scan, or may execute a script and/or program to poll or request the client 102 for information. In one embodiment, a collection agent 304 collects the information for the authentication vServer. The authentication vServer and/or the traffic management vServer may send the collection agent 304 to the client 304 to perform the endpoint analysis scan. The endpoint analysis scan may be initiated as part of one or more AAA actions (e.g., pre-authentication actions) by the authentication vServer. This endpoint analysis scan may also be initiated as part of one or more traffic management actions by the traffic management vServer. Further, the traffic management vServer or the authentication vServer can initiate the endpoint analysis scan in response to an application of one or more policies 586, 568.

The authentication vServer receives the results of the endpoint analysis scan, which may include any type or form of client information. In some embodiments, the results include an expression, which may include any type or form of string, equation, list or command. The authentication vServer may receive one or more expressions evaluated by the client 102. The one or more expressions received may identify one or more attributes of the client 102. The results may identify a presence on the client 102 of one or more of: a version of an operating system, a service pack of the operating system, a running service, a running process, and a file. The results may also identify a presence on the client 102 of one or more of a presence or a version of: an antivirus software, personal firewall software, anti-spam software, and internet security software.

In some embodiments, the collection agent 304 may transmit the results to the authentication vServer and/or the traffic management vServer. In some other embodiments, the script and/or program transmitted to the client 102 may execute on the client 102 and transmit the results to the authentication vServer and/or the traffic management vServer. The client 102, the received script or the received program may transmit the collection agent 304, including the collected results, back to the authentication vServer. In other embodiments, the client 102 transmits the results to the authentication vServer and/or the traffic management vServer. The client 102 may send the results to the appliance 200 or intermediary 200, to be redirected to the authentication vServer and/or the traffic management vServer. The results may be encrypted, compressed, formatted and/or otherwise processed according to a communications protocol by the client 102 or otherwise before sending out from the client 102. These results may be processed upon receipt at the authentication vServer and/or the traffic management vServer to extract any required information. Further, the authentication vServer may process and/or evaluate these results according to one or more AAA or authentication policies 586.

In further details of step 803, the traffic management virtual server obtains the result from the authentication virtual server. The traffic management vServer may receive the result according to another predetermined frequency. This frequency may be substantially similar to, or include any embodiments of the frequency described above in connection with step 801. In some embodiments, the frequency is predetermined by the authentication vServer and/or one or more authentication policies. In some embodiments, the authentication vServer forwards all or part of the results to the traffic management vServer. The authentication vServer may process all or part of the results before forwarding to the traffic management vServer. In one embodiment, the authentication vServer provides an evaluation of one or more expressions identifying one or more attributes of the client 102 to the traffic management vServer. The authentication vServer may forward all or part of the results according to one or more AAA or authentication policies 586. The authentication vServer may also provide all or part of the results as input to the one or more traffic management policies 586 of the traffic management vServer.

In further details of step 805, the traffic management virtual server applies the result in one or more traffic management policies 586 to manage network traffic of a connection of the client 102 traversing the intermediary 200. The traffic management vServer may apply the result according to yet another predetermined frequency. This frequency may be substantially similar to, or include any embodiments of the frequency described above in connection with step 803. The traffic management vServer may apply all or part of the results from the authentication vServer to the one or more traffic management policies 586. The traffic management vServer may further process all or part of the results from the authentication vServer prior to applying the policies 586.

The traffic management vServer may determine a type of compression for the connection based on applying the one or more traffic management policies 586 using the results. Moreover, the traffic management vServer may determine a type of encryption for the connection based on applying the one or more traffic management policies 586 using the results. The traffic management vServer may also determine one or more file type associations for the connection based on applying the one or more traffic management policies using the results. Further, the traffic management vServer may determine whether or not to use a single-sign on for the connection based on applying the results via one or more traffic management policies. Based on the determination, the traffic management vServer can make one or more traffic management and/or AAA decisions to manage the traffic from the client 102 traversing the intermediary 200.

In some embodiments, method 800 may be applied in conjunction with method 600 of FIGS. 6A and 6B. For example, embodiments of method 800 may be implemented as part of steps 607 or 629 of method 600.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention as defined by the following claims.

What is claimed:

1. A method of managing traffic traversing an intermediary based on a result of end point analysis, the method comprising:
   a) determining, by an authentication virtual server of an intermediary device between at least one client device and at least one server, a result of an end point analysis scan of a client device initiated by the authentication virtual server and processing the result of the end point analysis scan before forwarding, by the authentication virtual server, to a separate and differently configured traffic management virtual server of the intermediary device, the authentication virtual server further configured to perform authentication of a user or the client device;

b) obtaining, by the traffic management virtual server, the result from the authentication virtual server; and c) applying, by the traffic management virtual server, the result in one or more traffic management policies to manage network traffic of a connection of the client device traversing the intermediary.

2. The method of claim 1, wherein step (a) further comprises receiving, by the authentication virtual server, from the client an expression identifying a presence on the client of one of the following: a version of an operating system, a service pack of the operating system, a running service, a running process, and a file.

3. The method of claim 1, wherein step (a) further comprises receiving, by the authentication virtual server, from the client an expression identifying one of a presence or a version of one of the following: antivirus software, personal firewall software, anti-spam software, and internet security software.

4. The method of claim 1, wherein step (a) further comprises receiving, by the authentication virtual server, one or more expressions evaluated by the client, the one or more expressions identifying one or more attributes of the client.

5. The method of claim 1, wherein step (b) further comprises providing, by the authentication virtual server, as the result an evaluation of one or more expressions identifying one or more attributes of the client.

6. The method of claim 1, wherein step (b) further comprises providing the result, by the authentication virtual server, as input to the one or more traffic management policies of the traffic management virtual server.

7. The method of claim 1, wherein step (c) further comprises determining, by the traffic management virtual server, a type of compression for the connection based on applying the one or more traffic management policies using the result.

8. The method of claim 1, wherein step (c) further comprises determining, by the traffic management virtual server, a type of encryption for the connection based on applying the one or more traffic management policies using the result.

9. The method of claim 1, wherein step (c) further comprises determining, by the traffic management virtual server, one or more file type associations for the connection based on applying the one or more traffic management policies using the result.

10. The method of claim 1, wherein step (c) further comprises determining, by the traffic management virtual server, to one of use or not use a single-sign on for the connection based on applying the result via the one or more traffic management policies.

11. An intermediary for managing traffic traversing the intermediary based on a result of end point analysis, the intermediary comprising:

a device between at least one client device and at least one server, an authentication virtual server of the device for performing authentication of a user or the client device, the authentication virtual server further configured for determining a result of an end point analysis scan of the client device initiated by the authentication virtual server, and for processing the result of the end point analysis scan before forwarding to a separate and differently configured traffic management virtual server of the intermediary;

the traffic management virtual server obtaining the result forwarded from the authentication virtual server, and applying the result in one or more traffic management policies to manage a connection of the client device traversing the intermediary.

12. The intermediary of claim 11, wherein the authentication virtual server receives from the client an expression identifying a presence on the client of one of the following: a version of an operating system, a service pack of the operating system, a running service, a running process, and a file.

13. The intermediary of claim 11, wherein the authentication virtual server receives from the client an expression identifying one of a presence or a version of one of the following: antivirus software, personal firewall software, anti-spam software, and internet security software.

14. The intermediary of claim 11, wherein the authentication virtual server receives one or more expressions evaluated by the client, the one or more expressions identifying one or more attributes of the client.

15. The intermediary of claim 11, wherein the authentication virtual server provides as the result an evaluation of one or more expressions identifying one or more attributes of the client.

16. The intermediary of claim 11, wherein the authentication virtual server provides the result as input to the one or more traffic management policies of the traffic management virtual server.

17. The intermediary of claim 11, wherein the traffic management virtual server determines a type of compression for the connection based on applying the one or more traffic management policies using the result.

18. The intermediary of claim 11, wherein the traffic management virtual server determines a type of encryption for the connection based on applying the one or more traffic management policies using the result.

19. The intermediary of claim 11, wherein the traffic management virtual server determines one or more file type associations for the connection based on applying the one or more traffic management policies using the result.

20. The intermediary of claim 11, wherein the traffic management virtual server determines to use or not use a single-sign on for the connection based on applying the result via the one or more traffic management policies.

* * * * *